US009880724B2

(12) United States Patent
Chen et al.

(10) Patent No.: US 9,880,724 B2
(45) Date of Patent: Jan. 30, 2018

(54) USER INTERFACE FOR VIEWING EVENT DATA

(71) Applicant: S & C Electric Co., Chicago, IL (US)

(72) Inventors: Zhen Chen, Baltimore, MD (US); Gokturk Ozer, Gaithersburg, MD (US); Nathan Patrick Hall, Rockville, MD (US)

(73) Assignee: S & C ELECTRIC CO., Chicago, IL (US)

( * ) Notice: Subject to any disclaimer, the term of this patent is extended or adjusted under 35 U.S.C. 154(b) by 257 days.

(21) Appl. No.: 14/683,728

(22) Filed: Apr. 10, 2015

(65) Prior Publication Data

US 2015/0293685 A1    Oct. 15, 2015

Related U.S. Application Data

(60) Provisional application No. 61/978,552, filed on Apr. 11, 2014.

(51) Int. Cl.
| H02J 13/00 | (2006.01) |
| G06Q 50/06 | (2012.01) |
| G06F 17/24 | (2006.01) |
| G06F 3/0484 | (2013.01) |
| G06F 3/0481 | (2013.01) |
| G06Q 10/10 | (2012.01) |

(52) U.S. Cl.
CPC ........ G06F 3/04847 (2013.01); G06F 3/0481 (2013.01); G06F 17/246 (2013.01); G06Q 10/10 (2013.01); H02J 13/001 (2013.01); G06Q 50/06 (2013.01); Y04S 10/40 (2013.01)

(58) Field of Classification Search
CPC ...... G06Q 10/10; G06Q 50/06; G06F 17/246; Y04S 10/40; G01D 4/004; H02J 13/001
See application file for complete search history.

(56) References Cited

U.S. PATENT DOCUMENTS

| 6,549,880 | B1 | 4/2003 | Willoughby et al. |
| 2001/0009425 | A1 | 7/2001 | Thomas et al. |
| 2005/0273281 | A1 | 12/2005 | Wall et al. |
| 2006/0004907 | A1* | 1/2006 | Pape ...................... G06Q 10/10 709/201 |
| 2008/0052027 | A1 | 2/2008 | Witter et al. |
| 2008/0307323 | A1 | 12/2008 | Coffman et al. |
| 2011/0145727 | A1* | 6/2011 | Koren .................... G06Q 10/10 715/752 |

OTHER PUBLICATIONS

International Search Report and Written Opinion for Application No. PCT/US2015/025339 dated Jul. 14, 2015.

* cited by examiner

*Primary Examiner* — Andrew Tank
(74) *Attorney, Agent, or Firm* — Marshall, Gerstein & Borun LLP; Randall G. Rueth

(57) ABSTRACT

Methods, systems, and non-transitory, tangible computer-readable medium for generating a graphical user interface to view status events for devices operating within an electrical distribution system over various time interval granularities and ranges are disclosed. The graphical user interface provides users with the ability to select various overall ranges of time and time intervals within these ranges. By generating a simple graphical user interface in this manner, operating personnel can more easily view an aggregation of data for the electrical power system, predict trends, and isolate and rectify recurring problems.

24 Claims, 13 Drawing Sheets

FIG. 3B

USER INTERFACE FOR VIEWING EVENT DATA

CROSS-REFERENCE TO RELATED APPLICATION

This application claims the priority benefit under 35 U.S.C. § 119(e) of U.S. Provisional Patent Application No. 61/978,552, filed Apr. 11, 2014, the disclosure of which is incorporated herein by reference in its entirety.

TECHNICAL FIELD

The present disclosure relates to a user interface and, more particularly, to a user interface that allows viewing of event data organized in various ways related to power utilities.

BACKGROUND

Power distribution systems typically include any number of various devices that act to ensure the safe and efficient distribution of electrical power. Typically, power distribution systems include distribution feeders originating in power distribution substations and leading to the source of supply for end customers of an electrical supply utility or agency. Additionally, power distribution systems may include any number of switches, transformers, breakers, line reclosers, etc. To further improve upon power distribution efficiency, reduce system downtime, and to provide information regarding outages and/or malfunctions within the power distribution system, many modern power distribution systems employ "smart" devices that can be monitored and/or controlled from a remote location. Modern power distribution systems therefore allow devices to be operated and maintained with minimal labor and human supervision.

Methods have been developed for monitoring devices and/or circuits within a power distribution system by communicating information sensed at strategic points to one or more monitoring entities. This information often takes the form of one or more status events reported from a particular device, which could include various degrees of diagnostic information. Service personnel can then use this information to locate and isolate problems within the power distribution system.

But the present means in which the status events are communicated to the one or more monitoring entities and made available to service personnel is not without issues. First, the status events obtained from power distribution system devices are often accessed via an arduous process of downloading log files from each power distribution system device one at a time, which prevents system personnel from easily viewing information from multiple devices concurrently. Second, the status events obtained from power distribution system devices are not easily organized in a chronological way, which prevents system personnel from easily juxtaposing status events with seasonal or other anomalous events that can be readily identified by a known date and time.

BRIEF DESCRIPTION OF THE DRAWINGS

FIG. 3B illustrates a view of a device-based sub-window showing device-based events in accordance with various embodiments of the present disclosure;

DETAILED DESCRIPTION

Methods, systems, and apparatus are described to generate and/or display a graphical user interface to allow a user to view status events of devices operating as part of an electrical power distribution system with various granularities and within various time ranges. The graphical user interface provides users with the ability to select various time ranges, time units, and/or time intervals within these ranges to view a number of status event occurrences. Additionally, the graphical user interface allows users to access several views of status events to better isolate recurring problematic devices and to identify trends based on the previous occurrence of events.

Figure 1:
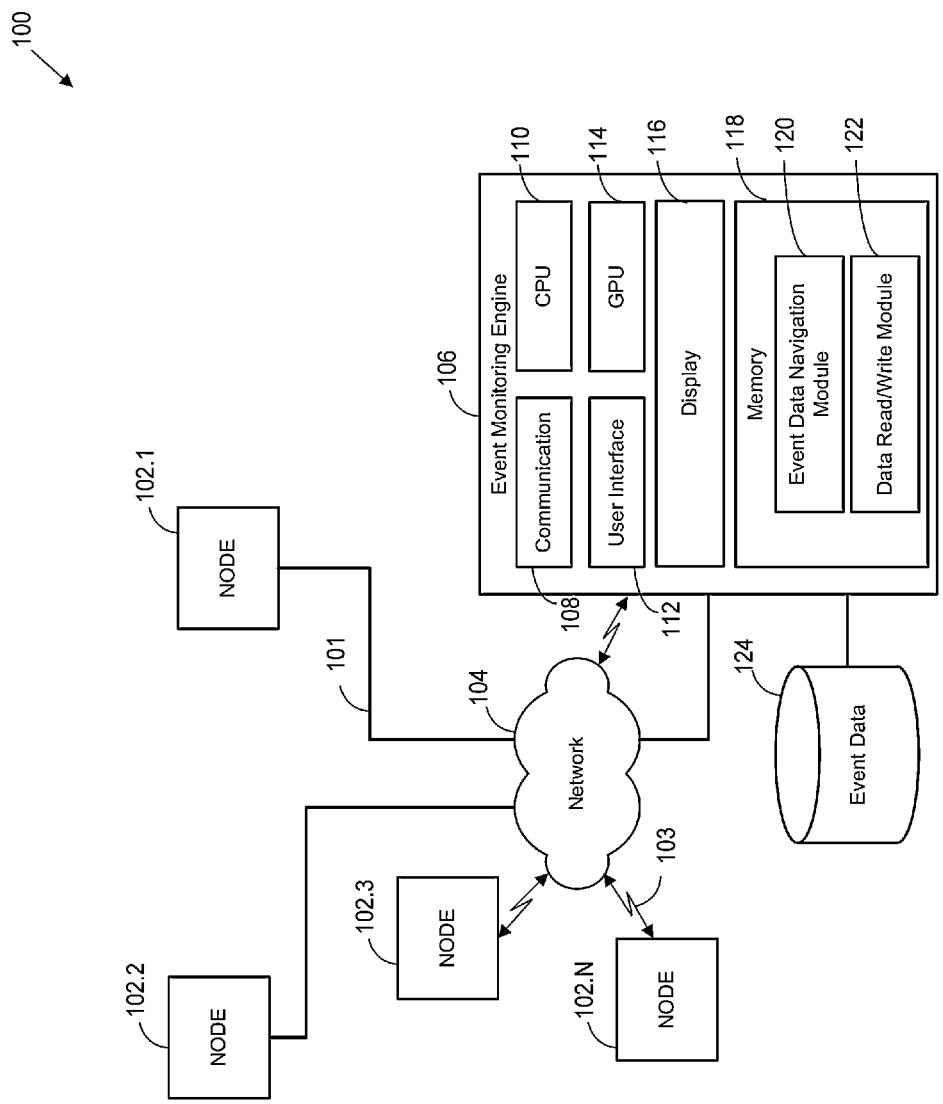
FIG. 1 is a block diagram of an electrical power distribution monitoring system 100 in which one or more nodes are monitored in accordance with various embodiments of the present disclosure.

FIG. 1 is a block diagram of an electrical power distribution monitoring system 100 in which one or more nodes are monitored in accordance with various embodiments of the present disclosure. Electrical power distribution system 100 includes N number of nodes 102.1-102.N, an event monitoring engine 106, an event database 124, and a network 104.

Nodes 102.1-102.N may be implemented as any portion of a suitable type of electrical device within an electrical distribution network. Some examples of nodes 102.1-102.N may include switches, breakers, fuses, fault isolation operators, transformers, etc. In various embodiments, the nodes 102.1-102.N log and/or transmit information pertaining to events and/or alerts via one or more networks, which is further discussed below.

In various embodiments, any of nodes 102.1-102.N may be integrated as part of the electrical device in which it monitors, or external to the device in which it monitors. In various embodiments, any of nodes 102.1-102.N may be configured to gather status event data from more than one electrical device, and multiple electrical devices may report status event information to one or more nodes 102.1-102.N.

Status event information can include any suitable type of information relevant to the operation of the electrical power distribution system in which the devices reporting this information are a part. For example, status event information could include information used in troubleshooting, monitoring, and/or diagnosing one or more electrical devices. More specifically, status event information could include, for example, a switching state, whether a device is in a normal operating state, an alarm condition, a fault state, a tripped state, an over-temperature condition, etc.

The additional components necessary for the distribution of electrical power services are not shown in FIG. 1. For example, power lines, power couplings, and the source and delivery of electrical power has been omitted from FIG. 1 for purposes of brevity. In various embodiments, the locations of nodes 102.1-102.N may be located at predetermined and/or strategic points within the electrical power distribution system, such as in proximity to the respective electrical devices in which they monitor (or integrated within the devices). Furthermore, the depiction of the number of nodes 102.1-102.N in FIG. 1 is for illustrative purposes. Electrical power distribution monitoring system 100 may include any suitable number of nodes 102.1-102.N based on the requirements and/or design preferences of a particular electrical power distribution system or any sub-part thereof.

In various embodiments, nodes 102.1-102.N may be configured to communicate with event monitoring engine 106 via network 104 utilizing any suitable number of wired links 101 and/or wireless links 103. Wired links 101 may support communications between nodes 102.1-102.N and network 104 with any suitable number of wires, buses, etc., and in accordance with any suitable type and number of communication protocols. In embodiments in which nodes 102.1-102.N communicate with network 104 via power line protocols, wired links 101 may represent any suitable portion of the respective power lines that are utilized for such communications. Wireless links 103 may support communications between nodes 102.1-102.N and network 104 in accordance with any suitable type and number of communication protocols.

Network 104 is configured to facilitate communications between nodes 102.1-102.N and event monitoring engine 106. In various embodiments, network 104 may include any suitable number of network nodes, wired and/or wired connections, links, etc. For example, in an embodiment, network 108 may be implemented as a local area network (LAN), a suitable combination of local and/or external network connections, any suitable number of cellular networks, any suitable number of public switched telephone networks (PTSNs), etc.

Event monitoring engine 106 is configured to communicate with one or more nodes 102.1-102.N via network 104 utilizing any suitable number of wired links 101 and/or wireless links 103. Event monitoring engine 106 includes a communication unit 108, a central processing unit (CPU) 110, a user interface 112, a graphics processing unit (GPU) 114, a display 116, and a memory 118. In an embodiment, event monitoring engine 106 is implemented as a user equipment (UE) such as a mobile device, a computer, a laptop, a tablet, a desktop computer, a wearable computer, or any other suitable type of computing device.

Communication unit 108 is configured to enable data communications between one or more nodes 102.1-102.N and event monitoring engine 106 via network 104. Communication unit 108 is configured to enable data communications between event monitoring engine 106 and event database 124 via any suitable number of wired and/or wireless links. In an embodiment, communication unit 108 is configured to send data, such as requests for status event information, for example, to one or more nodes 102.1-102.N and receive data, such as status event information, for example, from one or more nodes 102.1-102.N. In an embodiment, communication unit 108 is configured to receive status events from one or more of nodes 102.1-102.N without sending a request. In various embodiments, communication unit 108 is configured to receive status events from one or more of nodes 102 synchronously, asynchronously, periodically, aperiodically, based on the available bandwidth of a respective wired and or wireless link to one or more of nodes 102, etc.

In various embodiments, communication unit 108 is configured to process the status event information data received from one or more nodes 102, to write the status event information to database 124, and/or to read the status event information stored in events database 124. Communication unit 108 may be implemented with any combination of suitable hardware and/or software to facilitate this functionality. For example, communication unit 108 may be implemented with any number of wired and/or wireless transceivers, network interfaces, physical layers (PHY), etc. In various embodiments, communication unit 108 optionally enables communications between event monitoring engine 106 and one or more networks, which may or may not be part of network 104. For example, communication unit 108 may be configured to communicate with cellular and/or WLAN networks in addition to network 104. Networks separate from network 104 are not shown in FIG. 1 for purposes of brevity.

CPU 110 and/or GPU 114 are configured to communicate with memory 118 to store to and read data from memory 118. In accordance with various embodiments, memory 118 is a computer-readable non-transitory storage device that may include any combination of volatile (e.g., a random access memory (RAM)) or a non-volatile memory (e.g., battery-backed RAM, FLASH, etc.).

Memory 118 is configured to store instructions executable on the CPU 110 and/or the GPU 114. These instructions may include machine readable instructions that, when executed by CPU 110 and/or GPU 114, cause the CPU 110 and/or GPU 114 to perform various acts.

User interface 112 is configured to allow a user to interact with event monitoring engine 106. For example, user interface 112 may include a user-input device such as an interactive portion of display 116 (e.g., a "soft" keyboard displayed on display 116), an external hardware keyboard configured to communicate with event monitoring engine 106 via a wired or a wireless connection (e.g., a BLUETOOTH keyboard), an external mouse, or any other suitable user-input device.

In various embodiments, user interface 112 is configured to provide a graphical user interface via display 116. In accordance with such embodiments, user interface 112 allows a user to select one or more time-scaling parameters and/or desired data viewing options to view status event information associated with one or more electrical devices, which is then organized and displayed in accordance with the selected time-scaling parameters.

Event data navigation module 120 is a portion of memory 118 configured to store instructions, that when executed by CPU 110 and/or GPU 114, cause CPU 110 and/or GPU 114 to enable user interface 112 to collect user input and to display feedback to a user in accordance with one or more applications and/or programs. For example, executable instructions stored in event data navigation module 120 may enable user interface 112 to display one or more prompts to a user and/or to accept user input, which could include selecting one or more time-scaling parameters and/or selecting a desired organizational viewing of the status event information, for example.

In an embodiment, instructions stored in event data navigation module 120 enable a user to enter suitable time-scaling parameters and/or to view status event information in various ways that are presented in accordance with the selected time-scaling parameters, which are further discussed below. For example, instructions stored in event data navigation module 120 could enable a user to select, via a portion of user interface 112 displayed on display 116, time-scaling parameters regarding a selected time unit (e.g., days), a selected time range (e.g., 1 day), and an associated time interval (e.g., 5 minutes). Further expanding upon this example, instructions stored in event data navigation module 120 allow for the organization of status event information received via event database 124 and/or one or more of nodes 102.1-102.N into "buckets" of 5 minute time intervals within the selected 1 day range, which could be the previous 24 hours or any other suitable range of 1 day that has been selected (e.g., between 4 and 5 days ago, between 2 and 3 days ago, etc.).

Using the previous example, various embodiments include event data navigation module 120 having instructions stored thereon to enable a user to view status event information that is organized in a variety of different ways. Examples of different views include a display of the number of the status events received within each of the selected time intervals, a history of all status events sorted by each device and received within the selected range, and/or a snapshot of the most recent status events sorted by each device and limited to one of each event type received within the selected range. In this way, instructions stored in event data navigation module 120 enable a user to utilize user interface 112 to select, sort, and organize status event information with varying time-scaled granularities over various ranges in time. This advantageously allows a user to identify and predict trends of various status events based on the number of status events that occurred over the selected ranges and intervals of time, when specific types of status events occurred, and/or the types of devices associated with certain status events.

Data read/write module 122 includes instructions that, when executed by CPU 110, causes CPU 110 to read data from and/or to write data to event database 124 and/or one or more of nodes 102 via communication unit 108. In an embodiment, data read/write module 122 enables CPU 110 to access event database 124 and/or one or more of nodes 102 and to process and/or organize the events in accordance with the selected time-scaling parameters and/or a selected organizational viewing of the event data.

In accordance with an embodiment, data read/write module 122 enables CPU 110 to update and/or overwrite data in event database 124. For example, updating may be performed when data is deleted from event database 124. In an embodiment, data read/write module 122 enables CPU 110 to query data from event database 124 and/or one or more of nodes 102.1-102.N and/or to store this data in memory 118. Further in accordance with this embodiment, data read/write module 122 includes instructions that enable CPU 110 to access stored data from memory 118 when executing instructions from event data navigation module 120 and/or other portions of memory 118.

Event database 124 may store status events in any suitable format relevant for retrieval, organization, and/or display. In various embodiments, event database 124 is implemented within event monitoring engine 106, separate from event monitoring engine 106, or external to event monitoring engine 106.

In accordance with various embodiments, any of event data navigation module 120 and/or data read/write module 122 operates as a separately executable software application, a plugin that extends the functionality of another software application such as a web browser, an application programming interface (API) invokable by a software application, etc. The instructions included within any of event data navigation module 120 and/or data read/write module 122 may be compiled and executable on the CPU 110 directly, or not compiled and interpreted by the CPU 110 on a runtime basis.

FIG. 1 illustrates event monitoring engine 106 coupled directly to event database 124 for purposes of brevity. As will be appreciated by those of skill in the relevant art(s), various embodiments of event monitoring engine 106 include event monitoring engine 106 accessing event database 124 via any suitable network, which may be substantially similar in architecture and/or functionality to network 104, for example. In accordance with such embodiments, event monitoring engine 106 is configured to access event database 124 via a network such that event database 124 and/or event monitoring engine 106 need not be co-located. For example, in accordance with such embodiments, event monitoring engine 106 may access event database 124 via a connection to the Internet to download relevant status events. To provide another example, event monitoring engine 106 may access event database 124 via a local, secure connection to one or more private servers to download status event information.

Although illustrated as a single engine in FIG. 1, in various embodiments, event monitoring engine 106 may be implemented as any number or group of one or more event monitoring engines. In accordance with such embodiments, each event monitoring engine may include one or more CPUs and be configured to operate independently of the other event monitoring engines. Event monitoring engines operating as a group may process requests from one or more nodes 102 individually (e.g., based on their availability and/or bandwidth) and/or concurrently (e.g., parallel processing). Event monitoring engines operating as a group may process status event information received from one or more nodes in a prioritized and/or distributed manner. For example, an operation associated with processing a request may be performed on one event monitoring engine while another operation associated with processing the same request (or a different request) is performed on another event monitoring engine.

Figure 2:
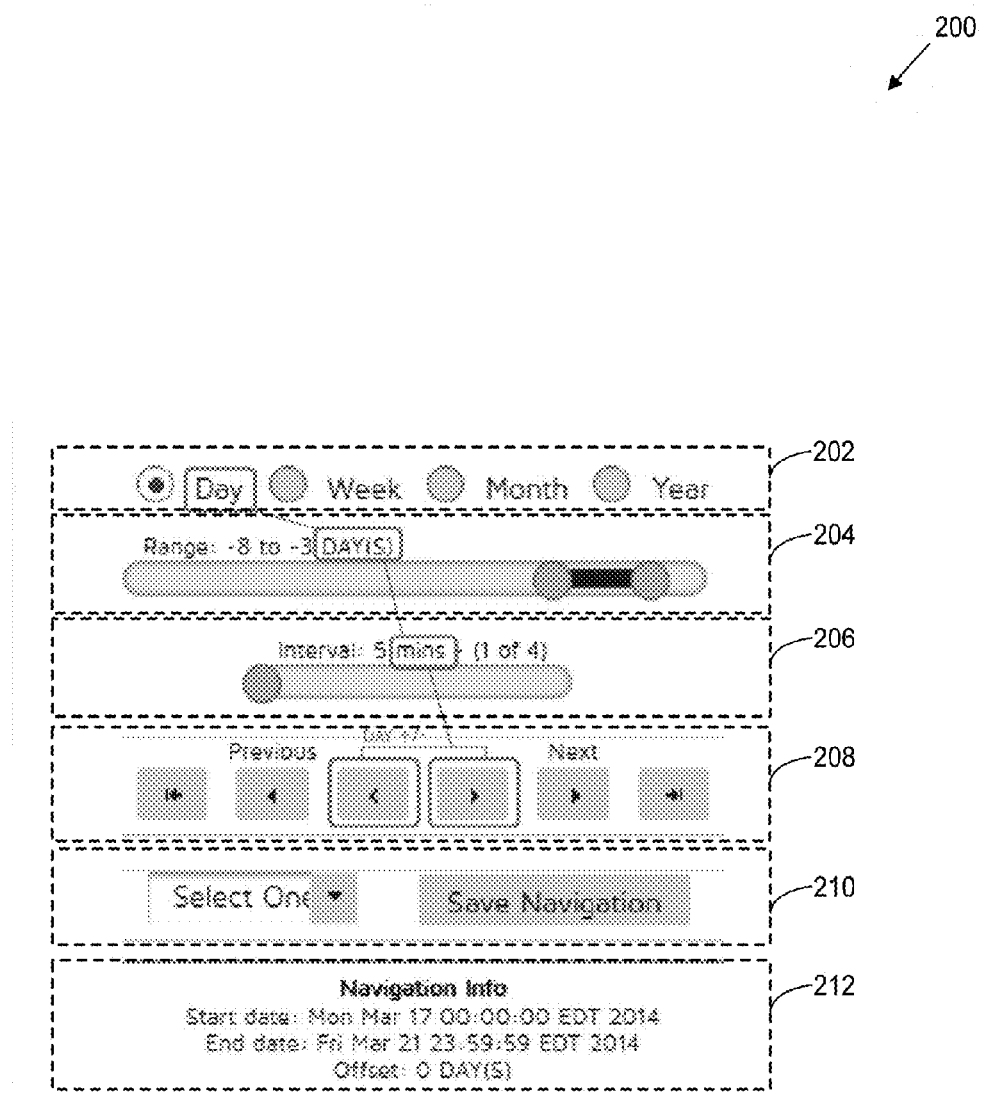
FIG. 2 illustrates a navigational sub-window 200 in accordance with various embodiments of the present disclosure.

FIG. 2 illustrates a navigational sub-window 200 in accordance with various embodiments of the present disclosure. Navigational sub-window 200 includes interface portions 202, 204, 206, 208, and 210, and a status portion 212.

In an embodiment, navigational sub-window 200 is a sub-window within an application program window that constitutes a portion of a user interface viewed on a display associated with a computing device. For example, in an embodiment, navigational sub-window 200 may be part of user interface 112 that is displayed on display 116 as part of event monitoring engine 106, as shown in FIG. 1.

As previously discussed with reference to FIG. 1, navigational sub-window 200 provides a user with several interface portions to facilitate a user's selection of one or more time-scalable parameters and/or to allow a user to control various aspects of the application program. As will be discussed further below, selection of the time-scaling parameters and/or controls within navigational sub-window 200 allow a user to view a number of status events and/or the devices associated with the status events according to the selected time-scaling parameters and/or other user actions.

Interface portion 202 provides a user with several selectable time unit s. As shown in FIG. 2, interface portion 202 allows a user to select one of four time units, corresponding to days, weeks, months, or years. The selectable time units shown in FIG. 2 are but one example of selectable time units. Various embodiments of interface portion 202 include displaying any suitable number and/or type of selectable time units.

When a user selects a time unit from interface portion 202, the remaining interface portions 204, 206, and 208 update their respective time-scalable parameters accordingly. For example, as shown in FIG. 2, once a user selects the "day" time unit from interface portion 202, interactive portion 204 displays the selectable range parameters in terms of days. In addition, the interactive buttons within interface portion 208 allow a user to adjust the range in term of days. In an embodiment, interface portions 204, 206, and 208 update their respective time units based on the currently selected time unit from interface portion 202.

Interface portion 202 provides a user with the ability to select a time unit based on the range and granularity of status events that are desired to be viewed. For example, if a user only wants to view status events over summer months, then a user can select the time unit in terms of months. Once the time units are selected, the user can select the range units in terms of the selected time units accordingly.

Interface portion 204 provides a user with the ability to select a range of time units over which the status events are desired to be viewed. For example, if a user only wants to view status events within a period of time between 8 and 3 days ago, then the user would select the range as indicated in interface portion 204 as shown in FIG. 2. The maximum range represented in interface portion 204 may be any suitable range based on the desired application in terms of time units. For example, the range maximums could be 30 days when day time units are selected, 6 weeks when week time units are selected, 12 months when month time units are selected, 5 years when year time units are selected, etc.

Once a user selects the time units and a desired range, a user may select a desired time interval in which to group the number of status events. In the example shown in FIG. 2, interface portion 206 provides a user with four different preset positions for a slider bar, which may correspond to any suitable time intervals based on the selected time units. For example, interface portion 206 could include preset time intervals corresponding to 5 minutes, 15 minutes, 30 minutes, and 60 minutes when "day" time units are selected. To provide another example, interface portion 206 could include preset time intervals corresponding to 1 day, 3 days, 5 days, and 7 days when "month" time units are selected. Interface portion 206 may include any suitable number of preset time intervals, which may be assigned any desired value based on a desired design and/or application.

As will be discussed further below, the selection of time intervals provides a time interval grouping in which to display a number of status events. For example, if 50 status events were received from one or more of nodes 102.1-102.N between 8 and 3 days ago, the selection of time intervals of 5 minutes will result in those status events that occurred between 8 and 3 days ago being displayed in buckets of 5 minute intervals, which is further discussed and illustrated below.

Interface portion 208 provides a user with an additional means to adjust the range selected in interface portion 204, which in turn updates the display of the respective set of status events. As shown in FIG. 2, interface portion 208 includes an innermost set of buttons, a middle set of buttons, and an outermost set of buttons. Each of these sets of buttons provide a user with more flexibility in adjusting the range selected in interface portion 204 based on the presently selected time units.

In an embodiment, the innermost buttons allow a user to shift the range selected in interface portion 204 1 unit at both ends of the range, in accordance with the selected time units, which in turn affects those status events that may be displayed. For example, in accordance with such embodiments, if a user selects the right of the two innermost buttons, the range of −8 to −3 days would change to −7 to −2 days, adding a day to each end of the displayed range but maintaining a five-day range. Similarly, if a user selects the left of the two innermost buttons (without first having selecting the right button), the range of −8 to −3 days would change to −9 to −4 days, subtracting a day from each end of the displayed range but again, maintaining the five-day range. In this way, interface portion 208 allows a user to vary each end of the displayed range of status events at the same time, while interface portion 204 allows a user to vary one end of the displayed range of status events at a time. To provide another example, if the displayed range was in terms of week time units, then the innermost buttons could vary each end of the displayed range by 1 week instead of 1 day.

In an embodiment, the middle buttons allow a user to shift the range selected in interface portion 204 the entire length of the selected range at both ends of the range, in accordance with the selected time units, which in turn affects the status events that may be displayed. For example, in accordance with such embodiments, if a user selects the left of the two middle buttons, the range of −8 to −3 days (a total range of 5 days) would change to −13 to −8 days, shifting the displayed 5-day range backwards by 5 days from the earliest point within the range but maintaining the 5-day range. Similarly, if a user selects the right of the two innermost buttons (after having first selected the left button), the range of −13 to −8 days would change back to −8 to −3 days, shifting the displayed 5-day range forward by 5 days from the most recent point within the range and again, maintaining the 5-day range. In this way, interface portion 208 allows a user to step through and view status events of adjacent chronological ranges. To provide another example, if the displayed range was in terms of week time units, then the middle buttons could shift each end of the displayed range forward and backwards together by the total range in terms of weeks, and not days.

In an embodiment, the outermost buttons allow a user to offset the entire displayed range backwards and forwards by an amount that is equal to maximum displayed range in time units. For example, in accordance with such embodiments, if a user selects the left of the two outermost buttons, the displayed range of −8 to −3 days would not change, but the viewed status events would be updated to include those within −38 to −33 days ago, shifting the displayed 5-day range backwards by 30 days, assuming that 30 days is the maximum range associated with the entire scale bar shown in interface portion 204. Similarly, if a user selects the right of the two outermost buttons (after having first selected the left button), the status events viewed within a range of −38 to −33 days would change back to −8 to −3 days, shifting the displayed status events forward by 30 days.

Again, although the range displayed in interface portion 204 may not indicate a change when the outermost buttons are selected, the status event data that is viewed is updated accordingly. In such an embodiment, this offset is displayed in status portion 212 in the indicated offset field. In the previous example, shifting the status data back 30 days would result in the offset displaying a 30 days indication as "Offset: 30 DAY(S)."

In this way, interface portion 208 allows a user to "step through," and view status events of the same range offset by increments of additional time. To provide another example, if the displayed range was in terms of week time units, then the outermost buttons would shift the range offset forward and backwards together by the maximum range associated with the entire scale bar shown in interface portion 204 in terms of weeks, and not days.

In various embodiments, interface portion 210 provides a user with the ability to save and/or load various combinations of time-scaling parameters selected via interface portions 202, 204, 206, and/or 208. In this way, interface portion 210 allows a user to save various status event viewing profiles for subsequent viewing. In accordance with these embodiments, the left drop down menu provides a user with a list of previously saved status event viewing profiles, while the "save navigation" button allows a user to save status event viewing profiles.

Status portion 212 provides a user with information regarding the presently selected range of status events. Status portion 212 updates the displayed information in response to the time-scaling parameters selected in interface portions 202, 204, 206, and/or 208. In this way, status portion 212 provides a user with feedback regarding the currently selected range of status events that are being viewed.

Although navigational sub-window 200 is illustrated in FIG. 2 having specific implementations of interface and status portions, various embodiments of the present disclosure include any suitable graphical representation of interface portions 202, 204, 206, 208, 210, and status portion 212 to achieve the previously described functionality of gathering user selected time-scaling parameters and displaying this information as feedback to the user. For example, interface portion 202 may utilize check boxes instead of radio buttons; interface portion 206 may utilize buttons as opposed to a slider bar; interface portion 210 may implement a "file explore" button in contrast to the pull-down style file selection bar, etc.

Figure 3A:
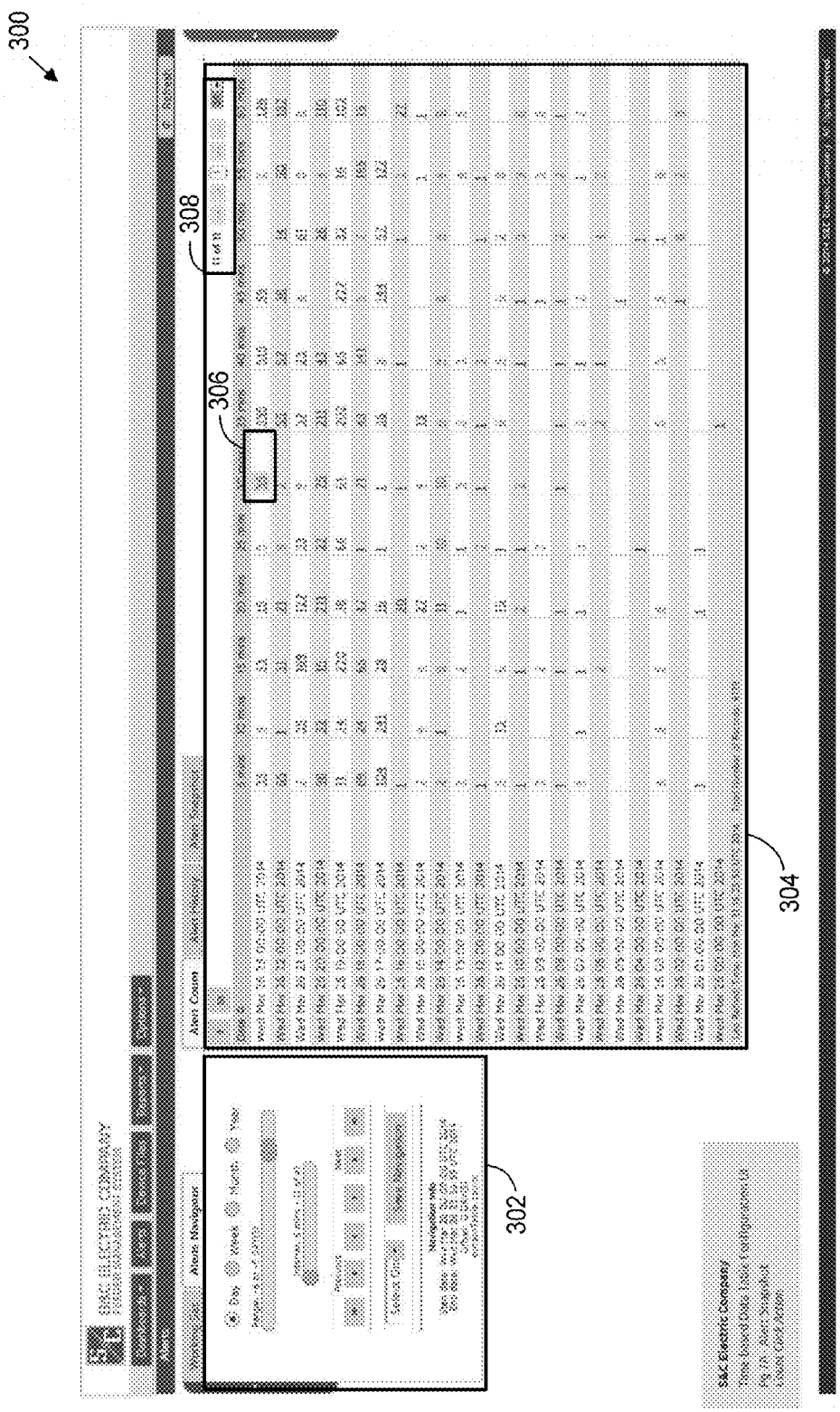
FIG. 3A illustrates a view of an application program window 300 in accordance with various embodiments of the present disclosure.

FIG. 3A illustrates a view of an application program window 300 in accordance with various embodiments of the present disclosure. Application program window 300 includes navigational sub-window 302 and event sub-window 304. In an embodiment, application program window 300 constitutes at least a portion of a user interface viewed on a display. In an embodiment, application program window 300 is part of user interface 112 that is displayed on display 116 as part of event monitoring engine 106, as shown in FIG. 1. In an embodiment, navigational sub-window 302 is an implementation of navigational sub-window 200, as shown in FIG. 2.

Again, navigational sub-window 302 allows a user to select one or more time-scaling parameters and displays the selected range of these time-scaling parameters as feedback displayed as part of the navigational sub-window labeled "navigational info." Additionally, event sub-window 304 displays the number of status events in an organized manner based on the selected time-scaled parameters from navigational sub-window 302. As a user adjusts the time scaling parameters from navigational sub-window 302, the organization of status events may be updated in event sub-window 304 to reflect these adjustments in real-time.

Using the example illustrated in FIG. 3A, event sub-window 304 has a multi-row, multi-column format resulting in a number of cells, some of which are populated with status event numbers. As shown in FIG. 3A, navigational sub-window 302 indicates a time unit of days, a 1 day range between −6 to −5 days, and a time interval of 5 minutes. As a result, each cell within event sub-window 304 moving from left to right represents a 5-minute interval, and the separation between each adjacent row represents an hour interval, as there are 12 columns shown in FIG. 3A. As shown in FIG. 3A, the range of status events selected in navigational sub-window 302 is 1 day. Thus, the number of rows corresponds to each hour within that day with a total of 24 rows. If additional days were selected such that the number of status events could not be displayed within a single sheet, various embodiments of event sub-window 304 provide additional sheets that allow a user to navigate to view additional status event numbers. As shown in an interface portion 308 of event sub-window 304, the total number of sheets may vary based on the range selected to allow a user to select one or more additional sheets, which are presented in a substantially similar manner as the first sheet shown in FIG. 3A, in an embodiment.

In other words, the groups of status events that were received within each 5 minute interval are organized in accordance with the selected time scaling parameters from navigational sub-window 302, which translates into a two-dimensional organization of the status events. For example, as shown in FIG. 3A, cell 306 includes the number 35, which corresponds to the time interval between 23:25:00.000 to 23:29.59.999 on Mar. 26, 2014. Accordingly, the number 35 contained in cell 306 corresponds to the number of status events received from one or more devices operating within a monitored electrical power distribution network within that time interval.

Although FIG. 3A is shown as a black and white illustration, various embodiments include displaying the status event numbers in event sub-window 304 as one or more varying colors. In accordance with such embodiments, various colors may be used to designate increasing numbers of status events, thus providing a means in which to easily view periods of time that have a greater number of status events than others. For example, multiple thresholds may be utilized such that, when each threshold is exceeded, the number of status events is displayed in a color based upon the number of thresholds that are exceeded.

To provide an illustrative example, thresholds of 1, 3, and 10 may be selected. The number of status events may be displayed as black by default, change to orange if the number of status events in a particular cell is greater than 3, and then change to red if the number of status events in a particular cell is greater than 10. In various embodiments, any suitable number of thresholds may be selected specifying any suitable combination of threshold values. Furthermore, such embodiments may use any combination of colors to indicate increasing numbers of status events in any suitable manner. Although discussed with reference to FIG. 3A, any window or sub-window discussed herein may utilize various color schemes to indicate increasing numbers of status events.

Figure 3B:
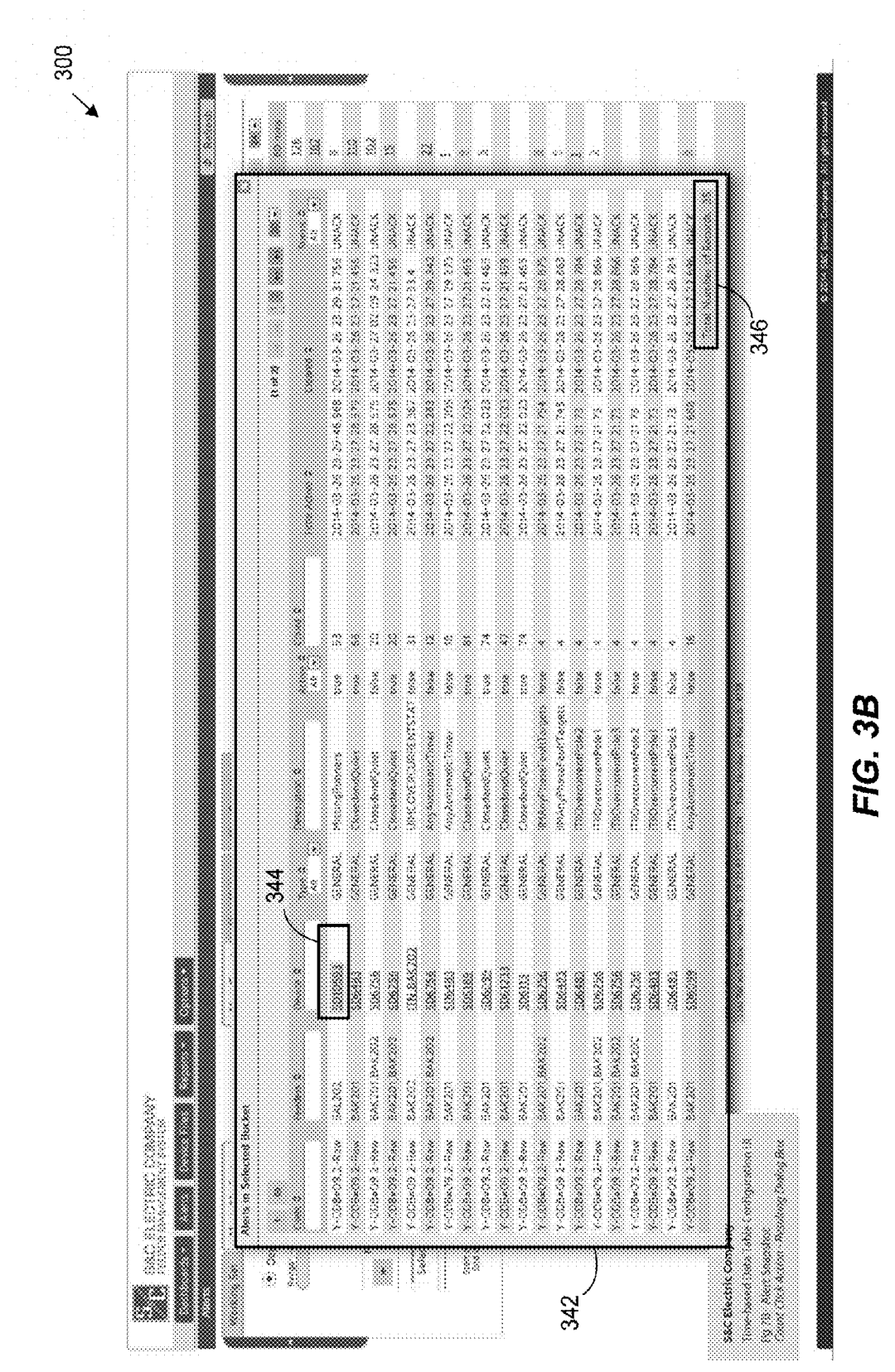

FIG. 3B illustrates a view of a device-based sub-window showing device-based events in accordance with various embodiments of the present disclosure. In an embodiment, each number displayed in one or more cells of event sub-window 304, as shown in FIG. 3A, provides a link to more information regarding the status events. In accordance with an embodiment, FIG. 3B illustrates a device-based sub-window 342 that is displayed upon a user selecting a number of status events that populates a cell of the event sub-window 304, as shown in FIG. 3A. In various embodiments, a user may select the number link by any suitable method, such as clicking the number with a mouse or other user interface, pressing an appropriate keyboard button, etc.

As shown in FIG. 3B, device-based sub-window 342 includes a total number of status events, or "alerts," corresponding to the selected cell 306, as shown in FIG. 3A. As shown in a record information portion 346, the total number of records (35) matches the number of status events that populated cell 306. Device-based sub-window 342 provides a listing of each status event occurring on any device within the selected time interval, even if a single device experiences multiple events of similar or different types. In other words, the device column shows any device as many times as necessary to display each of the 35 status events occurring in that interval.

In an embodiment, device-based sub-window 342 provides additional information regarding each status event for each device. For example, cell 344 contains device identifier "SD10593," which is associated with a "MissingRunners" status event that was reported with an active value of "true" 53 times throughout an extended period that is related to the most recent device software installation. More specifically, installation of software on a particular device could include, for example, any suitable software implemented to log and/or transmit the status events and/or other relevant information. If device SD10593 had other "Missing Runners" events within this same 5 minute interval, each individual event would be shown on its own line (i.e., row).

To provide another example, two events in the device-based sub-window 342 correspond to the same device identified as "SD6756," which is also associated with the same status event "ClosedandQuiet." This indicates that the "ClosedandQuiet" status of device "SD6756" transitioned from "false" to "true" and then from "true" to "false" within the configured 5 minute interval. As such, device-based sub-window 342 displays a line for each transition (event) of the "ClosedandQuiet" status with the most recent status having the "Active" state of false. The information displayed in device-based sub-window 342 indicates that device "SD6756" is most recently not in a "ClosedandQuiet" state.

Figure 3C:
FIG. 3C illustrates a view of a device-based sub-window showing information corresponding to a device in accordance with various embodiments of the present disclosure.

FIG. 3C illustrates a view of a device-based sub-window showing information corresponding to a device in accordance with various embodiments of the present disclosure. In an embodiment, the devices provided in device-based sub-window 342 provide a user with a selectable link to more information regarding the device. In accordance with an embodiment, FIG. 3C illustrates a device-based sub-window 362 that is displayed upon a user selecting a device that populates a cell of the device-based sub-window 342, as shown in FIG. 3B.

As shown in FIG. 3C, device-based sub-window 362 includes additional information corresponding to the selected device from cell 344, as shown in FIG. 3B. As shown in cell 364 in FIG. 3C, the device ID "SD10593" matches the device identifier shown in cell 344 of FIG. 3B. The information displayed in device-based sub-window 362 may include any suitable information obtained from the respective device. As shown in FIG. 3C, examples of this information can include serial numbers, network addresses, locations, device types, etc. In this way, various embodiments allow a user to quickly identify time intervals from event sub-window 304 associated with anomalous, unexpected, and/or problematic numbers of status events, and then allow a user to quickly pinpoint a device (and additional information related to the device) that is associated with these respective numbers of status events by "drilling down" into another appropriate device-based sub-window.

Figure 4A:
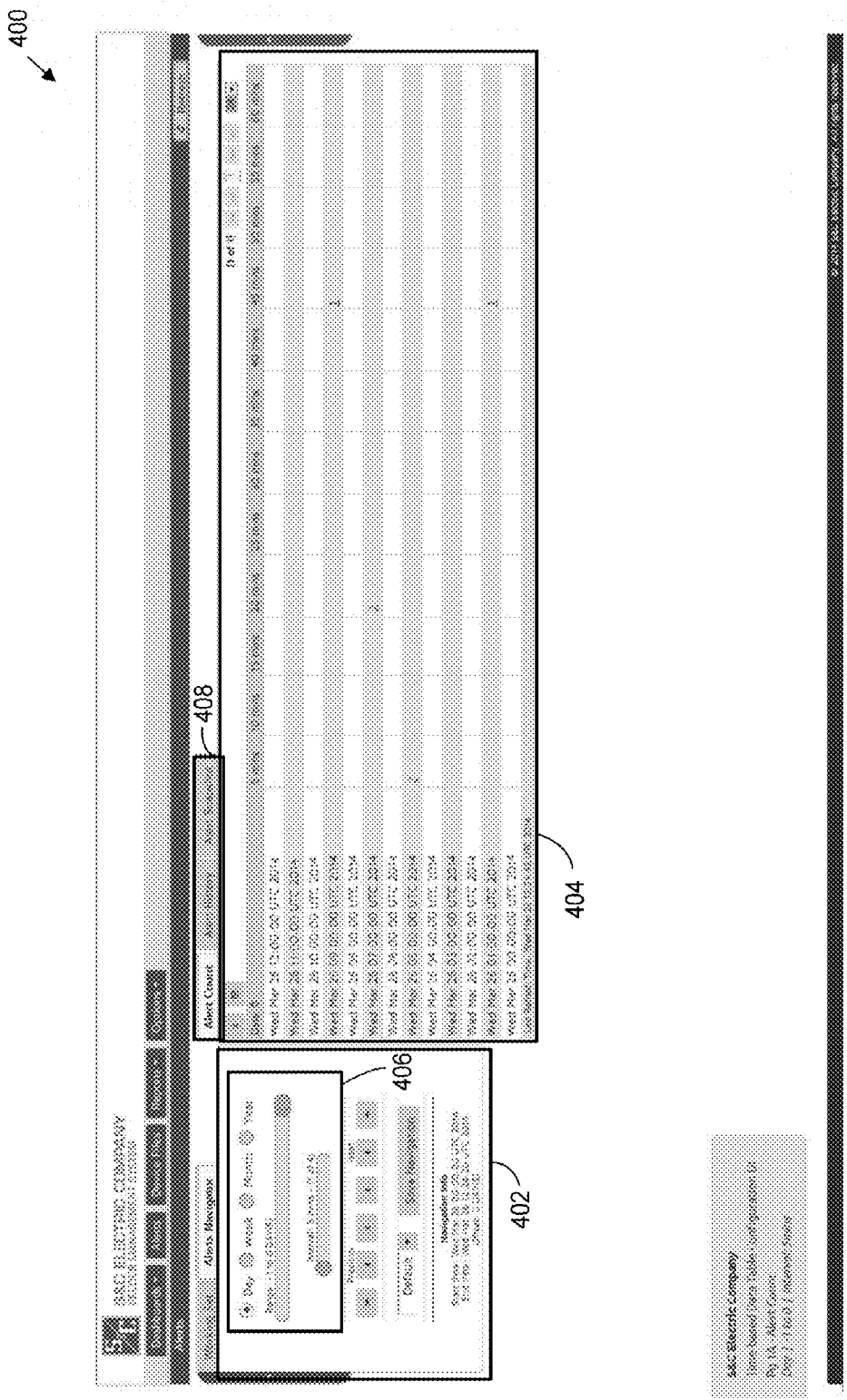
FIG. 4A illustrates a view of an application program window 400 corresponding to a first set of time-scaling parameters in accordance with various embodiments of the present disclosure.

FIG. 4A illustrates a view of an application program window 400 corresponding to a first set of time-scaling parameters in accordance with various embodiments of the present disclosure. Application program window 400 includes a navigational sub-window 402, an event sub-window 404, and a navigation interface portion 408. In an embodiment, application program window 400 constitutes at least a portion of a user interface viewed on a display. In an embodiment, application program window 400 is part of user interface 112 that is displayed on display 116 as part of event monitoring engine 106, as shown in FIG. 1. In an embodiment, navigational sub-window 402 is an implementation of navigational sub-window 200, as shown in FIG. 2. In an embodiment, event sub-window 404 is an implementation of event sub-window 304, as shown in FIG. 3A.

FIG. 4A illustrates event sub-window 404 having a multiple-row and multiple-column format similar to event sub-window 304, as shown in FIG. 3A. But just as event sub-window 304 displays status events in accordance with the time-scalable parameters selected in navigational sub-window 302, event sub-window 404 displays status events in accordance with the time-scalable parameters selected in navigational sub-window 402. More specifically, event sub-window 404 displays status events in accordance with a range of 1 day and intervals of 5 minutes, which is reflected by the time-scaled parameters within a portion 406 of navigational sub-window 402.

In an embodiment, navigation interface portion 408 includes three tabs, as shown in FIG. 4A. Each of the three tabs corresponds to a different view of status events, as will be discussed further below. As illustrated in FIG. 4A, event sub-window 404 is displayed upon a user selecting the "alert count" tab. Although status events are referred to as alerts throughout this disclosure, the term alert is not to be interpreted as necessarily synonymous with an alarm condition and/or a malfunction of a particular device. In various embodiments, alerts correspond to status events, and may include one or more status identifiers that are periodically received from a device. Various embodiments of application program window 400 include any suitable number of tabs to provide users with any suitable number of organizational views.

Figure 4B:
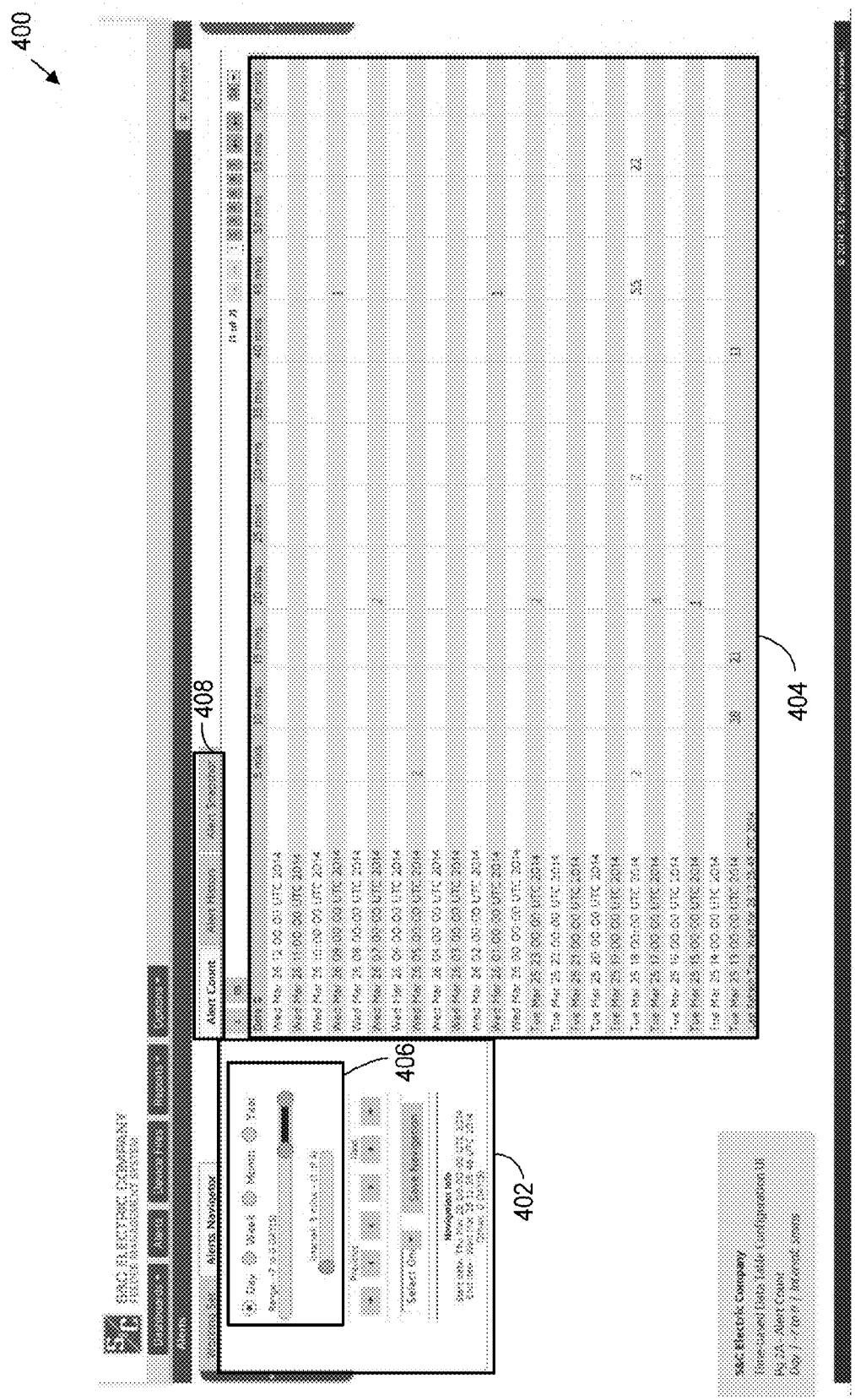
FIG. 4B illustrates a view of application program window 400 corresponding to a second set of time-scaling parameters in accordance with various embodiments of the present disclosure.

FIG. 4B illustrates a view of application program window 400 corresponding to a second set of time-scaling parameters in accordance with various embodiments of the present disclosure. More specifically, event sub-window 404, as shown in FIG. 4B, displays status events in accordance with a range between 0 and −7 days and intervals of 5 minutes, which is reflected by the time-scaled parameters within the combined interface portion 406 of navigational sub-panel 402. In other words, event sub-window 404, as shown in FIG. 4B, displays status events that occurred in the past 7 days. As shown by comparing FIGS. 4A and 4B, the increase in range from 1 day to 7 days results in an additional number of cells displaying a respective number of status events that occurred within each time interval represented by that particular cell. As a result of expanding the range of status event occurrences from 1 day to 7 days, the number of event-sub window sheets that may be viewed within event sub-window 404 increases from 1 (as shown in FIG. 4A, "1 of 1") to 7 (as shown in FIG. 4B, "1 of 7").

Figure 4C:
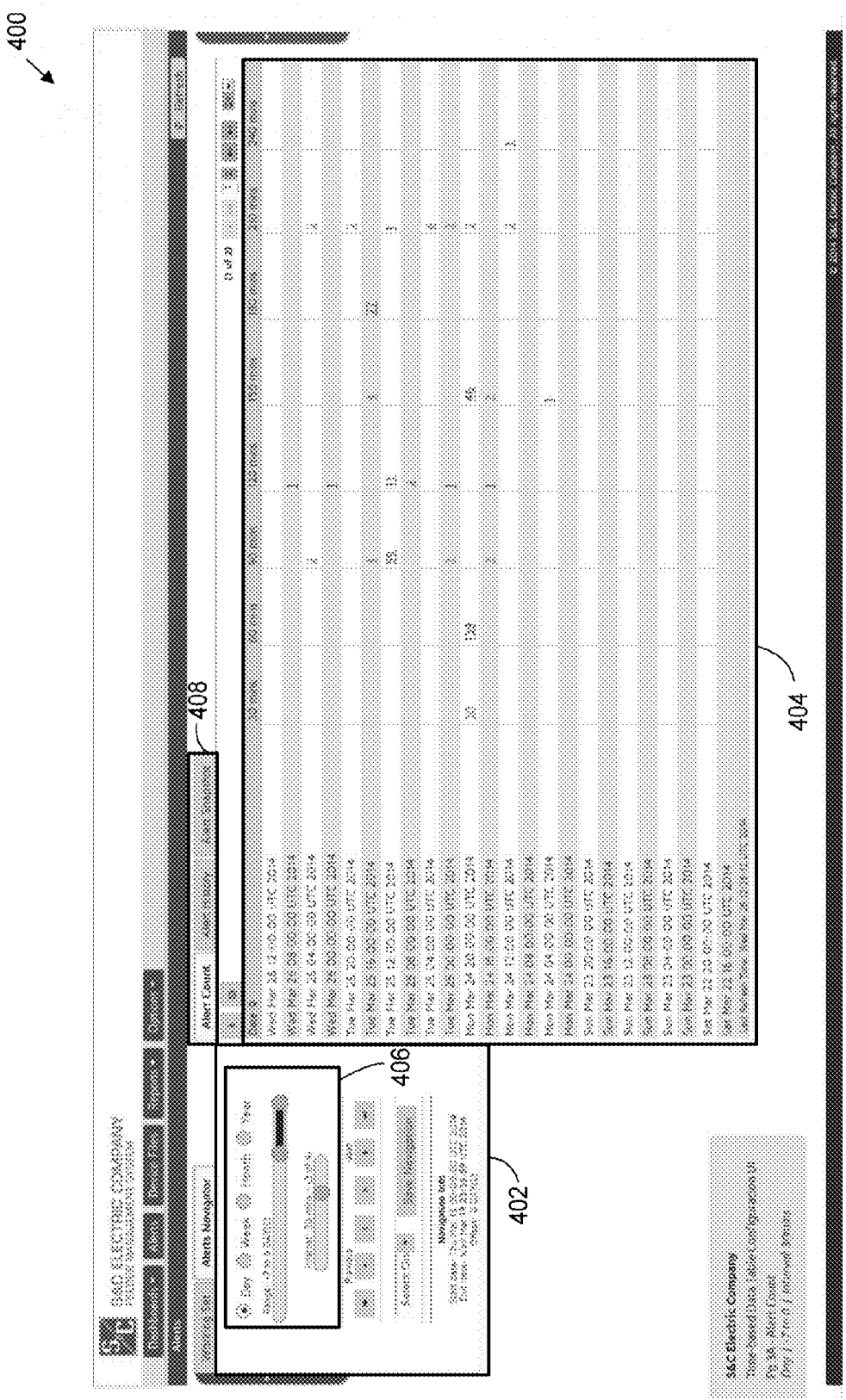
FIG. 4C illustrates a view of an application program window 400 corresponding to a third set of time-scalable parameters in accordance with various embodiments of the present disclosure.

FIG. 4C illustrates a view of an application program window 400 corresponding to a third set of time-scalable parameters in accordance with various embodiments of the present disclosure. More specifically, event sub-window 404, as shown in FIG. 4C, displays status events in accordance with the same range as shown in FIG. 4B (i.e., between 0 and −7 days) but the time intervals have increased from 5 minutes in FIG. 4B to 30 minutes in FIG. 4C, which once again is reflected by the time-scaled parameters within the combined interface portion 406 of navigational sub-window 402.

As shown in FIG. 4C, the increased time intervals result in an additional number of status events being populated in several of the cells of event sub-window 404 of FIG. 4C, since each cell in event sub-window 404 shown in FIG. 4C represents an aggregation of 6 cells from event sub-window 404 shown in FIG. 4B. Furthermore, since each of the cells of event sub-window 404 of FIG. 4C represents a greater time interval compared to the cells of event sub-window 404 of FIG. 4B, the total number of sheets that may be viewed has decreased from 7 in FIG. 4B to 2 in FIG. 2C as a result.

Figure 5A:
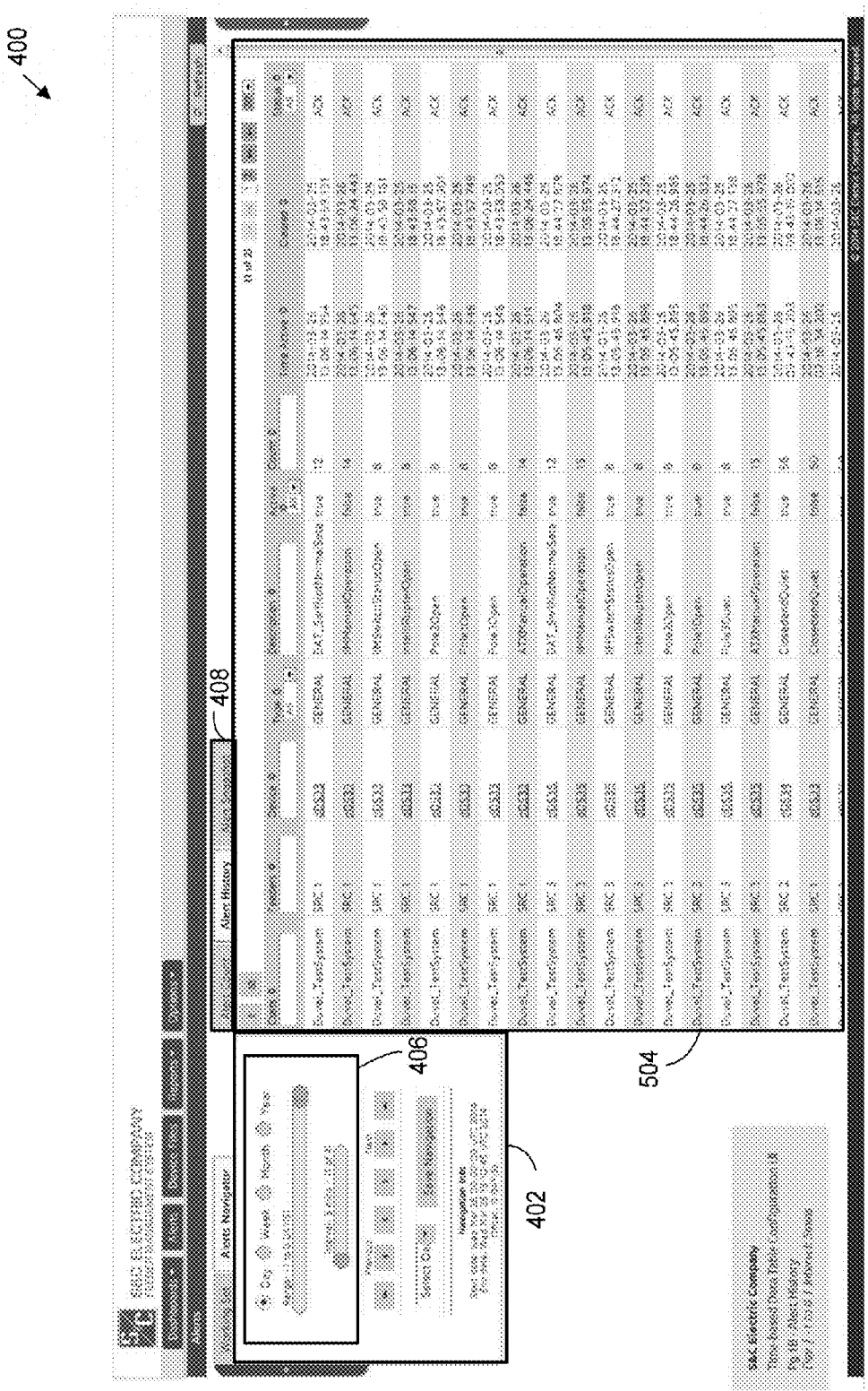
FIG. 5A illustrates an alternate view of an application program window 400 corresponding to the set of time-scalable parameters as shown in FIG. 4A in accordance with various embodiments of the present disclosure.

FIG. 5A illustrates an alternate view of an application program window 400 corresponding to the set of time-scalable parameters as shown in FIG. 4A in accordance with various embodiments of the present disclosure. Application program window 400 includes navigational sub-window 402, navigation interface portion 408, and event sub-window 504. In an embodiment, event sub-window 504 is displayed upon a user selecting the "alert history" tab from the navigation interface portion 408.

As shown in FIG. 5A, navigational sub-window 402 includes the same set of time-scaling parameters as in FIG. 4A. But event sub-window 504 provides different information based on these time-scaling parameters. As shown in FIG. 5A, event sub-window 504 displays a listing of each number of status events on a unique event-per-device basis. In an embodiment, event sub-window 504 displays all events that have occurred within the range selected in navigational sub-window 402.

In other words, the first entry shown in event sub-window 504 corresponds to device "dDS33," which has a status event associated with "DAT_Sw1NotNormalSate" having a value of "true." The aggregated numbers of status events that have occurred since the installation of status event logging and/or transmitting software on a particular device are denoted as "counts" in event sub-window 504. In various embodiments, these counts may be reset if new software is installed on a device, such as device dDS33 in this example. As a result, in an embodiment, the displayed counts are independent of the configuration corresponding to navigational sub-window 402. Therefore, expanding upon the previous example, although the "DAT_Sw1NotNormalSate" event happened at least once within the past day (based on the selected range), the event of "DAT_Sw1NotNormalSate" being true for device dDS33 has occurred a total of 12 times over the operating history of device dDS33.

In an embodiment, a user may utilize the appropriate tabs in navigational portion 408 to switch between the alert count and the alert history views as shown in FIGS. 4A and 5A, respectively. In this way, using the view shown in FIG. 4A, a user may identify how common status events occur over specific time intervals within a selected range of time in general, and then utilize the view as shown in FIG. 5A to determine which devices have a history of recurring types of status events.

Additionally or alternatively, colors may be used to provide an easy way for a user to identify the severity associated with the type of status event. In various embodiments, varying colors may be used to indicate varying degrees of severity for the events shown in FIG. 5A (or any window or sub-window discussed herein). To provide an illustrative example, an "IntelliRupterOpen" status event may be displayed in red while a "ClosedandQuiet" status event may be displayed in green. Various embodiments include any combination of colors to indicate increasing severity of status events in any suitable manner.

Figure 5B:
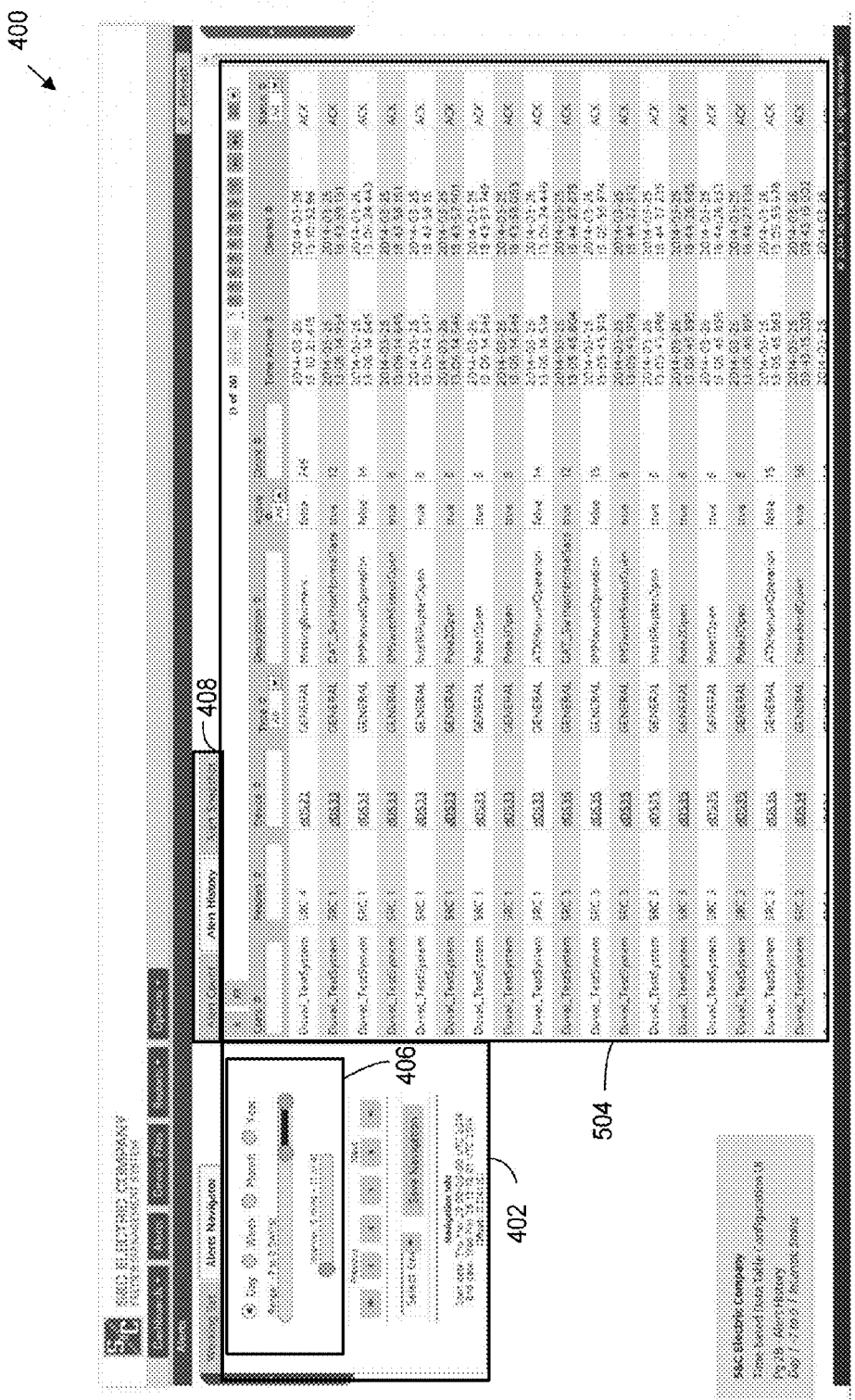
FIG. 5B illustrates an alternate view of an application program window 400 corresponding to the set of time-scalable parameters as shown in FIG. 4B in accordance with various embodiments of the present disclosure.

FIG. 5B illustrates an alternate view of an application program window 400 corresponding to the set of time-scalable parameters as shown in FIG. 4B in accordance with various embodiments of the present disclosure. As shown in FIG. 5B, event sub-window 504 displays a listing of each status event on a unique event-per-device basis, just as in FIG. 5A. But in FIG. 5B, event sub-window 504 displays additional status events, which can be observed by comparing the number of sheets available for viewing between FIGS. 5A and 5B (i.e., 2 in FIG. 5A versus 26 in FIG. 5B). This is due to the fact that FIG. 5B reflects status events that have occurred over a greater range of 7 days versus the 1 day in FIG. 5A.

By further comparing the differences between FIGS. 5A and 5B, a user can quickly determine information regarding the number of status events that happened between any two ranges. A user may therefore glean valuable troubleshooting and/or diagnostic information regarding the operation of various devices over specific time ranges by selecting and comparing various time ranges.

Figure 6A:
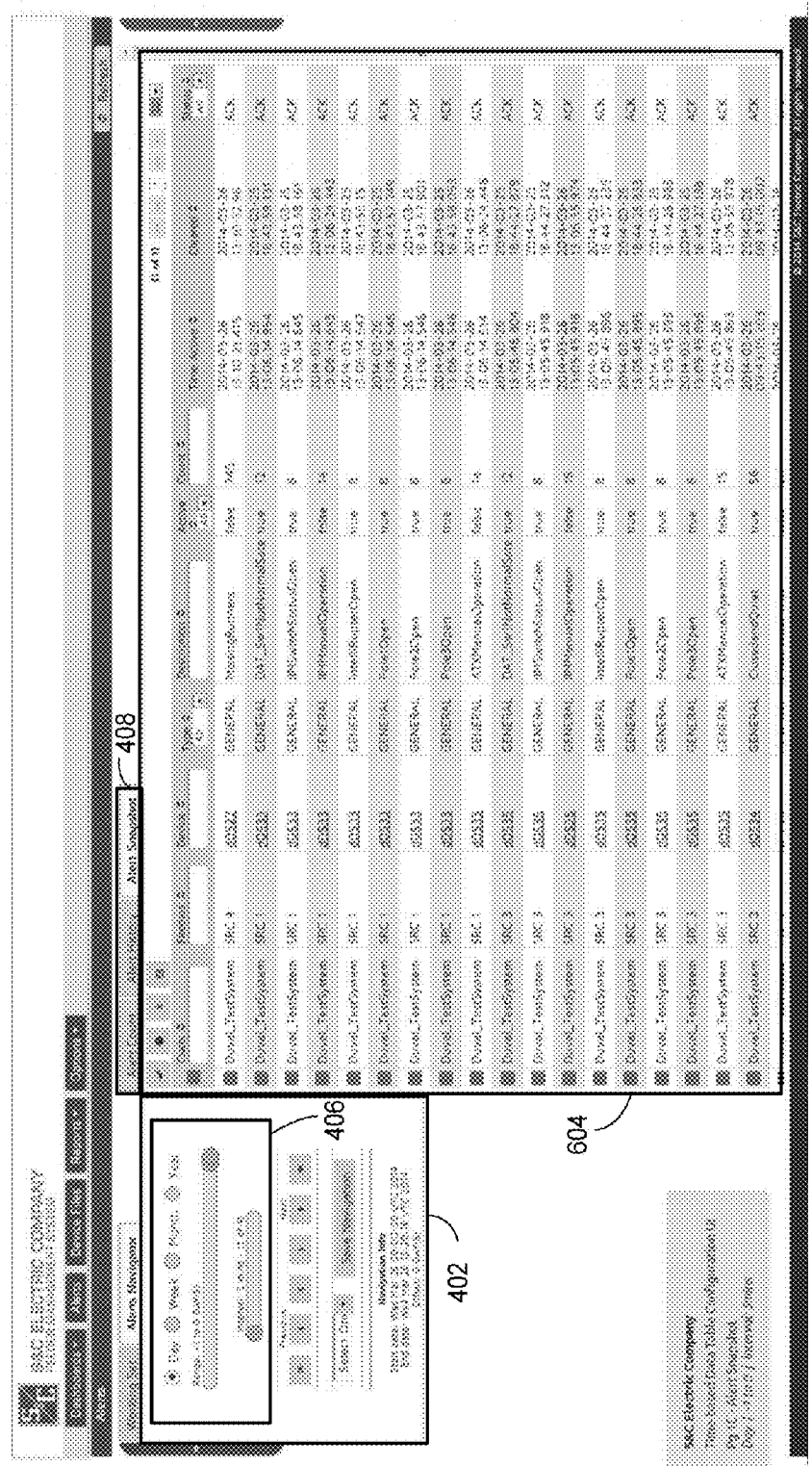
FIG. 6A illustrates an alternate view of application program window 400 corresponding to the set of time-scalable parameters as shown in FIGS. 4A and 5A in accordance with various embodiments of the present disclosure.

FIG. 6A illustrates an alternate view of application program window 400 corresponding to the set of time-scalable parameters as shown in FIGS. 4A and 5A in accordance with various embodiments of the present disclosure. As shown in FIG. 6A, navigational sub-window 402 includes the same set of time-scaling parameters as in FIGS. 4A and 5A. But event sub-window 604, as shown in FIG. 6A, displays status events organized in a different manner than FIGS. 4A and 5A. As shown in FIG. 6A, event sub-window 604 displays a listing of the most recent status events on a per-device basis that occurred within the selected range. In an embodiment, event sub-window 604 is displayed upon a user selecting the "alert snapshot" tab from the navigation interface portion 408.

For example, the top row status event shown in FIG. 6A is for device "dDS22," corresponding to an event "MissingRunners," which occurred a total of 745 times over the operating history of that device (or, alternatively, since the installation of suitable software for that device, since a reset condition, etc.). Although the range of viewed events in event sub-windows 404, 504, and 604, as shown in FIGS. 4A, 5A, and 6A, respectively, are equal to one another (a 1 day range), several event sub-windows display different amounts of data. For example, event sub-window 504, as shown in FIG. 5A displays more data (2 sheets) compared to event sub-window 604, as shown in FIG. 6A (1 sheet). This is because the status events displayed in FIG. 6A are sorted by those events that occurred most recently within the selected range.

As shown in FIG. 6A, the range selected in navigational sub-window 402 is from the present time to 1 day ago. More specifically, the navigation info portion of navigational sub-window 402 in FIG. 5A corresponds to a start time of Mar. 26, 2014 at 00:00:00 and an end time of Mar. 26, 2014 at 13:10:45. Although the events displayed in FIG. 5A can be sorted to display the most-recent events, which is discussed further below, event sub-window 604, as shown in FIG. 6A, differs from event sub-window 504, as shown in FIG. 5A, in various ways.

First, the navigation info portion of navigational sub-window 402 in FIG. 6A corresponds to a start date of Mar. 26, 2014 at 00:00:00 and an end date of Mar. 26, 2014 at 13:20:16. Thus, when a user selects the event sub-window 604 as shown in FIG. 6A associated with the alert snapshot tab by selecting the appropriate tab in navigational portion 408, the event status data is updated to include the most recent status events. Using the examples shown in FIGS. 5A and 6A, this results in approximately ten additional minutes of status event data being displayed in event sub-window 604 compared to event sub-window 504.

Second, event sub-window 604 also sorts the status events in an order of most recent to less recent up to the end of the selected range. Although a user could sort the status events displayed in event sub-window 504, a user can easily update the presently viewed range of status events as well as view those that occurred most recently by selecting the alert history tab in navigational portion 408. In this way, event sub-window 604 provides a user with a shortcut to view a sorted list of most recently occurring status events at any time.

The ability to sort and view status events quickly in terms their most recent occurrences can provide a user with up-to-date information on the devices operating within the electrical distribution system. This type of view could be especially useful, for example, when a new device has been installed and/or a malfunction has recently been detected, so the most recent status events associated with such devices can conveniently be displayed.

Figure 6B:
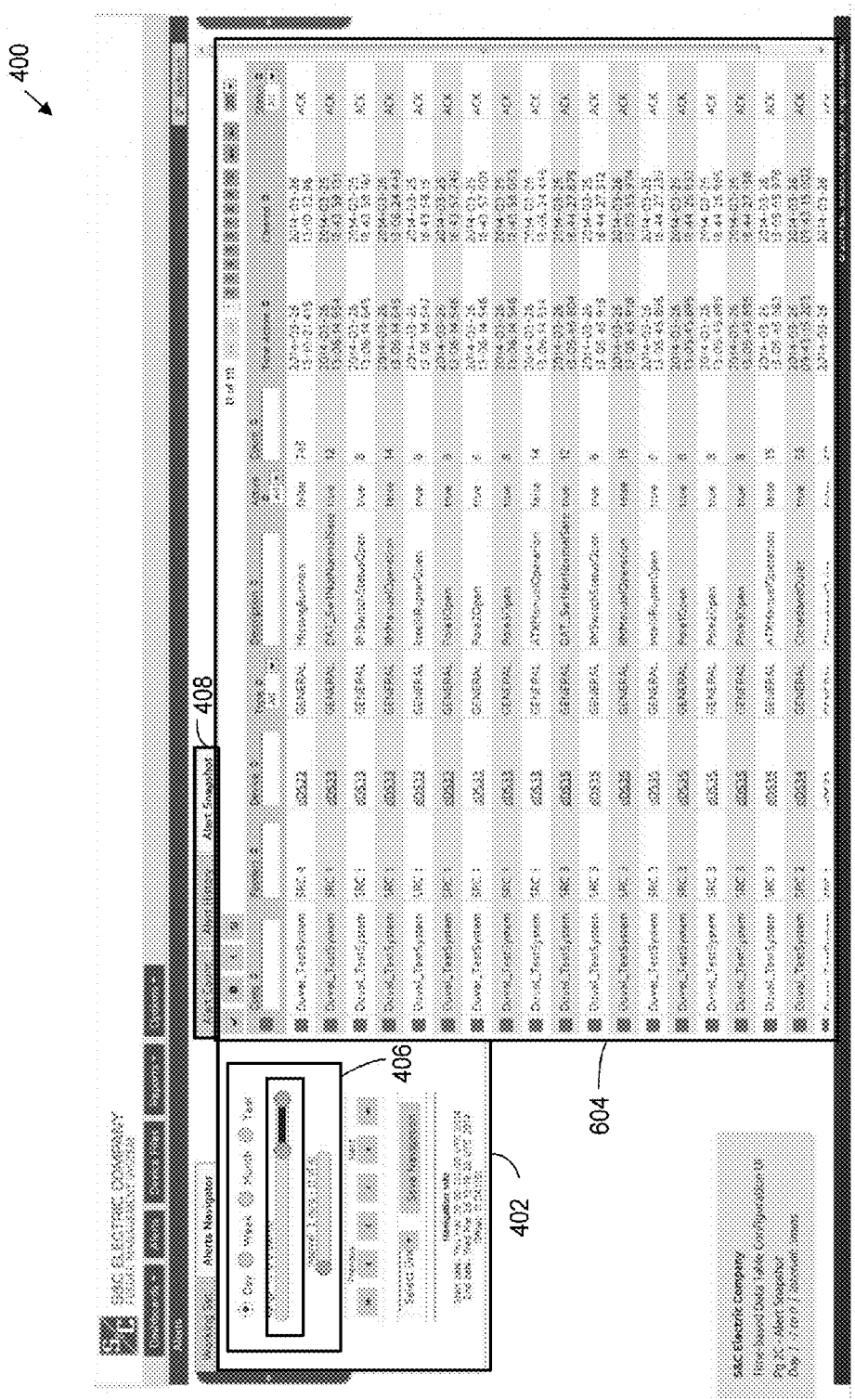
FIG. 6B illustrates an alternate view of application program window 400 corresponding to the set of time-scalable parameters as shown in FIGS. 4B and 5B in accordance with various embodiments of the present disclosure.

FIG. 6B illustrates an alternate view of application program window 400 corresponding to the set of time-scalable parameters as shown in FIGS. 4B and 5B in accordance with various embodiments of the present disclosure. As shown in FIG. 6B, event sub-window 604 displays a listing of the most recent status events, just as in FIG. 6A. But in FIG. 6B, event sub-window 604 displays additional status events, which can be observed by comparing the number of sheets available for viewing between FIGS. 6A and 6B (i.e., 1 in FIG. 6A versus the 11 in FIG. 6B). This is due to the fact that FIG. 6B reflects status events that have occurred over a greater range of 7 days versus the 1 day in FIG. 6A. In this way, event sub-window 604 displays status events sorted in a chronological order starting with the most recently occurring status events within a range selected by a user from navigational sub-window 402.

Figure 7:
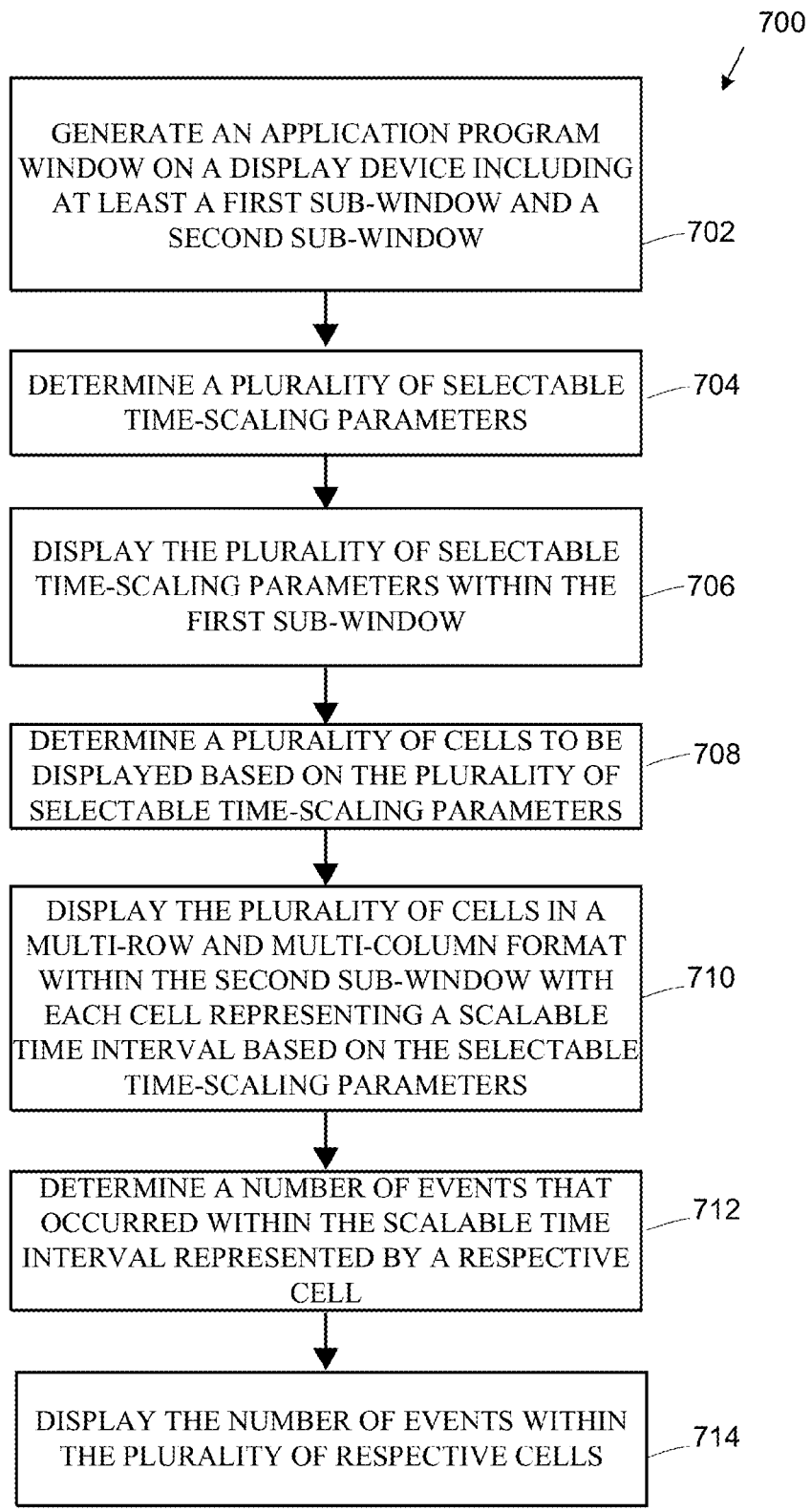
FIG. 7 is a flow diagram of an example method 700 in accordance with an embodiment of the present disclosure.

FIG. 7 is a flow diagram of an example method 700 in accordance with an embodiment of the present disclosure. In an embodiment, method 700 is performed by one or more processors, modules, algorithms, applications, etc., implemented by a suitable computing device, such as event monitoring engine 106, for example, as show in FIG. 1. In various embodiments, the computing device may utilize one or more processors to perform the acts as shown in FIG. 7, such as CPU 110 and/or GPU 114 executing instructions stored in one or more of event data navigation module 120 and/or data read/write module 122, for example, as shown in FIG. 1.

Method 700 begins when one or more processors generate an application program window on the display device including at least a first sub-window and a second sub-window (block 702). The computing device could be, for example, event monitoring engine 106, as shown in FIG. 1, in an embodiment (block 702). The first sub-window could be, for example, the navigational sub-window 200, as shown in FIG. 2 as well as throughout FIGS. 3-6, in an embodiment (block 702). The second sub-window could include, for example, the event sub-window 304 as shown in FIG. 3A as well as throughout FIGS. 4-6, in an embodiment (block 702).

Method 700 may include one or more processors determining a plurality of selectable time-scaling parameters (block 704). The plurality of selectable time-scaling parameters may include, for example, the selectable time units, time intervals, and ranges, as shown in interface portions 202, 204, and 206, respectively, in FIG. 2, in an embodiment (block 704).

Method 700 may include one or more processors displaying a plurality of cells in a multi-row and multi-column format within the second sub-window, with each cell from among the plurality of cells representing a scalable time interval based on the selectable time-scaling parameters (block 706). The plurality of cells could include, for example, the cells represented by the intersection of rows and columns as shown in FIG. 3A and also throughout FIGS. 4-6, in an embodiment.

Method 700 may include one or more processors determining a plurality of cells to be displayed based on the plurality of selectable time-scaling parameters (block 708). This determination could be made, for example, based on the selected time unit interval and/or the selected range such that a number of cells are displayed within one or more sheets, as shown in FIG. 3A, for example.

Method 700 may include one or more processors displaying the plurality of cells in a multi-row and multi-column format within the second sub-window with each cell representing a scalable time interval based on the selectable time-scaling parameters (block 710). This display could be include the second sub-window having the multi row and multi-column format as shown in FIG. 3A, for example.

Method 700 may include one or more processors determining a number of events that occurred within the scalable time interval represented by a respective cell (block 712). These number of events could include, for example, the numbers populating the cells of second sub-window 304, for example, as shown in FIG. 3A.

Method 700 may include one or more processors displaying the number of events within the plurality of respective cells (block 714). The events could be, for example, events that corresponding to a state of one or more devices operating as part of an electrical power system and monitored via the computing device.

Various advantages are apparent based upon the disclosure as described herein, which may include the ease in which a user may view and sort status events, for example. Additionally or alternatively, advantages of a more technical nature may be realized from the embodiments described herein. For example, because a user may more quickly find the source of a malfunctioning component, greater efficiency may be realized resulting in less computing power that would otherwise be needed to sort through collected but unorganized status events. This, in turn, may provide the added benefit of power savings compared to a computing device not implementing the embodiments described herein.

A computing device implementing the embodiments described herein may also provide power savings by requiring less use of its associated display by a user due to facilitating the quick determination of device malfunctions. Still further, a computing device implementing the embodiments described herein may also provide increased efficiency in accessing a relevant database containing event data, as less data reads may be needed to diagnose a device issue as a result of the improved organization of status events, thereby saving power and bandwidth needed to communicate with a database in such a manner.

Not every aspect of the described user interface has been explained in detail for purposes of brevity. For example, the event sub-window shown throughout FIGS. 3B, 5A, 5B, 6A, and 6B include a plurality of columns for each device name, associated feeder, status event type, description, etc. Various embodiments include these columns being sorted and filtered by user interaction. More specifically, the "▲" and "▼" characters provided at the top of each of these columns allow a user to sort the displayed status events in an order applicable to the respective column, such as alphabetical, by device type, by count number, etc. To provide another example, the white boxes illustrated at several of these columns allow a user to type a portion of applicable information in each respective box, which filters the displayed status events accordingly, such as by a particular device type, count number, etc., depending on the input characters.

In addition, various embodiments may include a departure from the illustrations described throughout this disclosure without departing from the spirit and scope thereof. For example, although the status event times shown in terms of coordinated universal time (UTC), various embodiments include recording and/or displaying the status event times in terms of Greenwich Mean time (GMT), converting the displayed times from another time standard or time zone, etc.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein, which may include operations such as data acquisition, storage, post-processing, etc.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A graphical user interface, comprising:

an application program window including at least a first sub-window and a second sub-window, the application program window being (i) generated by an application program operating on a computing device, and (ii) presented on a display associated with the computing device;

wherein the first sub-window displays a plurality of selectable time-scaling parameters, wherein the second sub-window displays a plurality of cells in a multi-row and multi-column format, each cell from among the plurality of cells representing a scalable time interval based on the selectable time-scaling parameters, and wherein a number of events is displayed within one or more of the plurality of cells, the number of events representing how many events occurred within the scalable time interval represented by a respective cell, the events corresponding to a state of one or more devices operating as part of an electrical power distribution system.

2. The graphical user interface of aspect 1, wherein the plurality of selectable time-scaling parameters are selected from the group consisting of:
   selectable time units;
   selectable range units; and
   selectable time intervals.

3. The graphical user interface of aspects 1 or 2, wherein the scalable time interval represented by each of the plurality of cells corresponds to an interval that is selected from the selectable time intervals.

4. The graphical user interface of any one of the preceding aspects, wherein:
   the number of events are displayed as user-selectable links,
   a third sub-window is displayed upon a user selecting a number of events displayed within a respective cell in the second sub-window, and
   the third sub-window displays events that occurred within the scalable time interval represented by the respective cell for which the number of events was selected, the events being sorted according to their time of occurrence.

5. The graphical user interface of any one of the preceding aspects, wherein:
   each corresponding device from among the plurality of devices is displayed as respective user-selectable links within the third sub-window,
   a fourth sub-window is displayed upon a user selecting a device displayed as a user-selectable link in the third sub-window, and
   the fourth sub-window displays information corresponding to the device that is selected.

6. The graphical user interface of any one of the preceding aspects, wherein the application program window displays a user-selectable first tab, a user-selectable second tab, and a user-selectable third tab, and
   wherein selection of the user-selectable first, the user-selectable second, and the user-selectable third tab results in the application program window displaying the second sub-window, a third sub-window, and a fourth sub-window, respectively.

7. The graphical user interface of any one of the preceding aspects, wherein the third sub-window (i) displays the events sorted by their respective time of occurrence, and (ii) indicates one or more corresponding devices from among the plurality of devices having events that occurred during a range indicated by the selectable range units.

8. The graphical user interface of any one of the preceding aspects, wherein the third sub-window (i) displays the most recently occurring events sorted by their time of occurrence, and (ii) indicates a type of event associated with each of the one or more corresponding devices from among the plurality of devices having events that occurred during a range indicated by the selectable range units.

9. A method of generating a graphical user interface on a display associated with a computing device, comprising:
   generating, by one or more processors, an application program window including at least a first sub-window and a second sub-window;
   determining, by one or more processors, a plurality of selectable time-scaling parameters;
   displaying, by one or more processors, the plurality of selectable time-scaling parameters within the first sub-window;
   determining, by one or more processors, a plurality of cells to be displayed based on the plurality of selectable time-scaling parameters;
   displaying, by one or more processors, the plurality of cells in a multi-row and multi-column format within the second sub-window, each cell from among the plurality of cells representing a scalable time interval based on the selectable time-scaling parameters;
   determining, by one or more processors, a number of events that occurred within the scalable time interval represented by a respective cell; and
   displaying, by one or more processors, the number of events within the plurality of respective cells, the events corresponding to a state of one or more devices operating as part of an electrical power distribution system.

10. The method of aspect 9, wherein the plurality of selectable time-scaling parameters are selected from the group consisting of:
    selectable time units;
    selectable range units; and
    selectable time intervals.

11. The method of aspects 9 or 10, wherein the scalable time interval represented by each of the plurality of cells corresponds to an interval that is selected from the selectable time intervals.

12. The method of any one of aspects 9 through 11, wherein the act of displaying the number of events within one or more of the plurality of cells comprises:
    displaying the number of events as user-selectable links, and further comprising:
    displaying, by the computing device, a third sub-window upon a user selecting a number of events displayed within a respective cell in the second sub-window, the third sub-window displaying events that occurred within the scalable time interval represented by the respective cell for which the number of events was selected, the events being sorted according to their time of occurrence.

13. The method of any one of aspects 9 through 12, wherein the act of displaying the third sub-window comprises:
    displaying each corresponding device from among the plurality of devices as respective user-selectable links within the third sub-window, and further comprising:
    displaying, by the computing device, a fourth sub-window upon a user selecting a device link in the third sub-window, the fourth sub-window displaying information corresponding to the device that is selected.

14. The method of any one of aspects 9 through 13, further comprising:
    displaying, by the computing device, a user-selectable first tab, a user-selectable second tab, and a user-selectable third tab; and
    displaying, by the computing device, the second sub-window, a third sub-window, and a fourth sub-window upon selection of the user-selectable first tab, the user-selectable second tab, and the user-selectable third tab, respectively.

15. The method of any one of aspects 9 through 14, wherein the act of displaying the third sub-window comprises:
    displaying the events sorted by their respective time of occurrence, and
    wherein the third sub-window indicates one or more corresponding devices from among the plurality of devices having events that occurred during a range indicated by the selectable range units.

16. The method of any one of aspects 9 through 15, wherein the act of displaying the third sub-window comprises:
    displaying the most recently occurring events sorted by their time of occurrence, and wherein the third sub-window indicates a type of event associated with each of the one or more corresponding devices from among the plurality of devices having events that occurred during a range indicated by the selectable range units.

17. A non-transitory, tangible computer-readable medium storing machine readable instructions that, when executed by a processor of a computing device having a display associated therewith, cause the processor to:
generate an application program window on the display including at least a first sub-window and a second sub-window;
determine a plurality of selectable time-scaling parameters;
display a plurality of selectable time-scaling parameters within the first sub-window;
determine a plurality of cells to be displayed based on the plurality of selectable time-scaling parameters;
display a plurality of cells in a multi-row and multi-column format within the second sub-window, each cell from among the plurality of cells representing a scalable time interval based on the selectable time-scaling parameters;
determine a number of events that occurred within the scalable time interval represented by a respective cell; and
display a number of events within one or more of the plurality of cells, the events corresponding to a state of one or more devices operating as part of an electrical power distribution system.

18. The non-transitory, tangible computer-readable medium of aspect 17, wherein the plurality of selectable time-scaling parameters are selected from the group consisting of:
selectable time units;
selectable range units; and
selectable time intervals.

19. The non-transitory, tangible computer-readable medium of aspects 17 or 18, wherein the scalable time interval represented by each of the plurality of cells corresponds to an interval that is selected from the selectable time intervals.

20. The non-transitory, tangible computer-readable medium of any one of aspects 17 through 19, further storing machine readable instructions that, when executed by the processor, cause the processor to:
display the number of events within one or more of the plurality of cells as user-selectable links; and
display a third sub-window upon a user selecting a number of events displayed within a respective cell in the second sub-window, the third sub-window displaying events that occurred within the scalable time interval represented by the respective cell for which the number of events was selected, the events being sorted according to a time of occurrence of each of the events.

21. The non-transitory, tangible computer-readable medium any one of aspects 17 through 20, further storing machine readable instructions that, when executed by the processor, cause the processor to:
display each corresponding device from among the plurality of devices as respective user-selectable links within the third sub-window; and
display a fourth sub-window upon a user selecting a device displayed as a user-selectable link in the third sub-window, the fourth sub-window displaying information corresponding to the device that is selected.

22. The non-transitory, tangible computer-readable medium any one of aspects 17 through 21, further storing machine readable instructions that, when executed by the processor, cause the processor to:
display a user-selectable first tab, a user-selectable second tab, and a user-selectable third tab within the application program window; and
display the second sub-window, a third sub-window, and a fourth sub-window upon selection of the user-selectable first tab, the user-selectable second tab, and the user-selectable third tab, respectively.

23. The non-transitory, tangible computer-readable medium any one of aspects 17 through 22, wherein the instructions to display the third sub-window further include instructions that, when executed by the processor, cause the processor to:
display the events sorted by their respective time of occurrence within the third sub-window, and
wherein the third sub-window indicates one or more corresponding devices from among the plurality of devices having events that occurred during a range indicated by the selectable range units.

24. The non-transitory, tangible computer-readable medium any one of aspects 17 through 23, wherein the instructions to display the third sub-window further include instructions that, when executed by the processor, cause the processor to:
display the most recently occurring events sorted by their respective time of occurrence, and
wherein the third sub-window indicates a type of event associated with each of the one or more corresponding devices from among the plurality of devices having events that occurred during a range indicated by the selectable range units.

What is claimed is:
1. A method of generating a graphical user interface on a display associated with a computing device, comprising:
receiving, by one or more processors, status events over a period of time that are indicative of a state of one or more devices included in an electrical distribution system;
generating, by one or more processors, an application program window including at least a first sub-window and a second sub-window;
determining, by one or more processors, a selected set of time-scaling parameters from among a plurality of selectable time-scaling parameters that are presented within the first sub-window;
calculating, by one or more processors, a plurality of time intervals based upon the selected set of time-scaling parameters;
displaying, by one or more processors, a plurality of cells in an intersecting multi-row and multi-column format within the second sub-window, each cell from among the plurality of cells representing a duration of time equal to respective ones of the plurality of time intervals, such that a duration of time represented by a column is equal to a proportion of a duration of time represented by a row;
calculating, by one or more processors, a number of status events that occurred within respective ones of the plurality of time intervals; and
displaying, by one or more processors, the number of the status events exceeding zero within one or more respective cells from among the plurality of cells.

2. The method of claim 1, wherein the plurality of selectable time-scaling parameters are selected from the group consisting of:
   selectable time units;
   selectable range units; and
   selectable time intervals.

3. The method of claim 2, wherein the time interval represented by each respective cell from among of the plurality of cells corresponds to an interval that is selected from the selectable time intervals.

4. The method of claim 2, further comprising:
   displaying, by the computing device, a user-selectable first tab, a user-selectable second tab, and a user-selectable third tab; and
   displaying, by one or more processors, the second sub-window, a third sub-window, and a fourth sub-window upon selection of the user-selectable first tab, the user-selectable second tab, and the user-selectable third tab, respectively.

5. The method of claim 4, wherein the act of displaying the third sub-window comprises:
   displaying the status events sorted by their respective time of occurrence, and
   wherein the third sub-window indicates one or more corresponding devices from among the one or more devices having status events that occurred during a range indicated by the selectable range units.

6. The method of claim 5, wherein the act of displaying the third sub-window comprises:
   displaying the most recently occurring status events sorted by their time of occurrence, and
   wherein the third sub-window indicates a type of status event associated with each of the one or more corresponding devices from among the one or more devices having status events that occurred during a range indicated by the selectable range units.

7. The method of claim 1, wherein the act of displaying the number of the status events exceeding zero within one or more respective cells from among the plurality of cells comprises:
   displaying the number of the status events as user-selectable links, and further comprising:
   displaying, by the computing device, a third sub-window upon a user selecting a number of the status events displayed within a respective cell in the second sub-window, the third sub-window displaying status events that occurred within the time interval represented by the respective cell for which the number of status events was selected, the status events being sorted according to their time of occurrence.

8. The method of claim 7, wherein the act of displaying the third sub-window comprises:
   displaying each corresponding device from among the one or more devices as respective user-selectable links within the third sub-window, and further comprising:
   displaying, by one or more processors, a fourth sub-window upon a user selecting a device link in the third sub-window, the fourth sub-window displaying information corresponding to the device that is selected.

9. A non-transitory, tangible computer-readable medium storing machine readable instructions that, when executed by a processor of a computing device having a display associated therewith, cause the processor to:
   receive status events over a period of time that are indicative of a state of one or more devices included in an electrical distribution system;
   generate an application program window on the display including at least a first sub-window and a second sub-window;
   determine a selected set of time-scaling parameters from among a plurality of selectable time-scaling parameters that are presented within the first sub-window;
   calculate a plurality of time intervals based upon the selected set of time-scaling parameters;
   display a plurality of cells in an intersecting multi-row and multi-column format within the second sub-window, each cell from among the plurality of cells representing a duration of time equal to respective ones of the plurality of time intervals, such that a duration of time represented by a column is equal to a proportion of a duration of time represented by a row;
   calculate a number of status events that occurred within respective ones of the plurality of time intervals; and
   display the number of events exceeding zero within one or more respective cells from among the plurality of cells.

10. The non-transitory, tangible computer-readable medium of claim 9, wherein the plurality of selectable time-scaling parameters are selected from the group consisting of:
   selectable time units;
   selectable range units; and
   selectable time intervals.

11. The non-transitory, tangible computer-readable medium of claim 10, wherein the time interval represented by each respective cell from among the plurality of cells corresponds to an interval that is selected from the selectable time intervals.

12. The non-transitory, tangible computer-readable medium of claim 10, further storing machine readable instructions that, when executed by the processor, cause the processor to:
   display a user-selectable first tab, a user-selectable second tab, and a user-selectable third tab within the application program window; and
   display the second sub-window, a third sub-window, and a fourth sub-window upon selection of the user-selectable first tab, the user-selectable second tab, and the user-selectable third tab, respectively.

13. The non-transitory, tangible computer-readable medium of claim 12, wherein the instructions to display the third sub-window further include instructions that, when executed by the processor, cause the processor to:
   display the status events sorted by their respective time of occurrence within the third sub-window, and
   wherein the third sub-window indicates one or more corresponding devices from among the one or more devices having status events that occurred during a range indicated by the selectable range units.

14. The non-transitory, tangible computer-readable medium of claim 13, wherein the instructions to display the third sub-window further include instructions that, when executed by the processor, cause the processor to:
   display the most recently occurring status events sorted by their respective time of occurrence, and
   wherein the third sub-window indicates a type of status event associated with each of the one or more corresponding devices from among the one or more devices having status events that occurred during a range indicated by the selectable range units.

15. The non-transitory, tangible computer-readable medium of claim 9, further storing machine readable instructions that, when executed by the processor, cause the processor to:

display the number of the status events within each respective cell from among the plurality of cells as user-selectable links; and display a third sub-window upon a user selecting a number of status events displayed within a respective cell in the second sub-window, the third sub-window displaying status events that occurred within the time interval represented by the respective cell for which the number of events was selected, the status events being sorted according to their time of occurrence.

16. The non-transitory, tangible computer-readable medium of claim 15, further storing machine readable instructions that, when executed by the processor, cause the processor to:

display each corresponding device from among the one or more devices as respective user-selectable links within the third sub-window; and display a fourth sub-window upon a user selecting a device displayed as a user-selectable link in the third sub-window, the fourth sub-window displaying information corresponding to the device that is selected.

17. An event monitoring engine, comprising:

a communication unit configured to receive status events over a period of time that are indicative of a state of one or more devices included in an electrical distribution system;

one or more processors configured to execute an application program; and a display configured to present, as a result of the one or more processors executing the application program, an application program window including at least a first sub-window and a second sub-window, and wherein the one or more processors are further configured to (i) determine a selected set of time-scaling parameters from among a plurality of selectable time-scaling parameters that are presented within the first sub-window, (ii) calculate a plurality of time intervals based upon the selected set of time-scaling parameters, and (iii) calculate a number of status events that occurred within respective ones of the plurality of time intervals;

wherein the second sub-window displays (i) a plurality of cells in an intersecting multi-row and multi-column format, each cell from among the plurality of cells representing a duration of time equal to respective ones of the plurality of time intervals, such that a duration of time represented by a column is equal to a proportion of a duration of time represented by a row, and (ii) the number of the status events exceeding zero within one or more respective cells from among the plurality of cells.

18. The event monitoring engine of claim 17, wherein the plurality of selectable time-scaling parameters are selected from the group consisting of:
selectable time units;
selectable range units; and
selectable time intervals.

19. The event monitoring engine of claim 18, wherein the time interval represented by each respective cell from among the plurality of cells corresponds to an interval that is selected from the selectable time intervals.

20. The event monitoring engine of claim 18, wherein the application program window displays a user-selectable first tab, a user-selectable second tab, and a user-selectable third tab, and wherein selection of the user-selectable first tab, the user-selectable second tab, and the user-selectable third tab results in the application program window displaying the second sub-window, a third sub-window, and a fourth sub-window, respectively.

21. The event monitoring engine of claim 20, wherein the third sub-window (i) displays the status events sorted by their respective time of occurrence, and (ii) indicates one or more corresponding devices from among the one or more devices having status events that occurred during a range indicated by the selectable range units.

22. The event monitoring engine of claim 21, wherein the third sub-window (i) displays the most recently occurring status events sorted by their time of occurrence, and (ii) indicates a type of status event associated with each of the one or more corresponding devices from among the one or more devices having status events that occurred during a range indicated by the selectable range units.

23. The event monitoring engine of claim 17, wherein:
the number of status events are displayed as user-selectable links,
the display is further configured to present, as a result of the one or more processors executing the application program, a third sub-window upon a user selecting a number of status events displayed within a respective cell in the second sub-window,
wherein the third sub-window displays status events that occurred within the time interval represented by the respective cell for which the number of status events was selected, the status events being sorted according to their time of occurrence.

24. The event monitoring engine of claim 23, wherein:
each corresponding device from among the one or more devices is displayed as respective user-selectable links within the third sub-window,
the display is further configured to present, as a result of the one or more processors executing the application program, a fourth sub-window upon a user selecting a device displayed as a user-selectable link in the third sub-window, and
the fourth sub-window displays information corresponding to the device that is selected.

* * * * *